US009183373B2

(12) United States Patent
Lioy

(10) Patent No.: US 9,183,373 B2
(45) Date of Patent: Nov. 10, 2015

(54) SECURE INPUT VIA A TOUCHSCREEN

(75) Inventor: Marcello V. Lioy, Mercer Island, WA (US)

(73) Assignee: QUALCOMM Incorporated, San Diego, CA (US)

( * ) Notice: Subject to any disclaimer, the term of this patent is extended or adjusted under 35 U.S.C. 154(b) by 669 days.

(21) Appl. No.: 13/402,330

(22) Filed: Feb. 22, 2012

(65) Prior Publication Data
US 2012/0299831 A1 Nov. 29, 2012

Related U.S. Application Data

(60) Provisional application No. 61/491,086, filed on May 27, 2011.

(51) Int. Cl.
G06F 21/36 (2013.01)
(52) U.S. Cl.
CPC .................................. *G06F 21/36* (2013.01)
(58) Field of Classification Search
CPC ......... G06F 21/83; G06F 21/36; G06F 21/84; G06F 3/04886; G07F 7/1041
See application file for complete search history.

(56) References Cited

U.S. PATENT DOCUMENTS

| 6,006,328 | A | 12/1999 | Drake | |
|---|---|---|---|---|
| 6,630,928 | B1 * | 10/2003 | McIntyre et al. | 345/173 |
| 7,836,513 | B2 | 11/2010 | Cradick et al. | |
| 8,176,324 | B1 * | 5/2012 | Krishnamurthy | 713/168 |
| 2002/0188872 | A1 | 12/2002 | Willeby | |
| 2002/0196237 | A1 | 12/2002 | Fernando et al. | |
| 2004/0006709 | A1 | 1/2004 | Chen | |
| 2004/0233173 | A1 * | 11/2004 | Bryant | 345/169 |
| 2004/0268135 | A1 * | 12/2004 | Zimmer et al. | 713/189 |

(Continued)

FOREIGN PATENT DOCUMENTS

| DE | 102004031677 A1 | 1/2006 |
|---|---|---|
| EP | 1288874 A2 | 3/2003 |

(Continued)

OTHER PUBLICATIONS

Tan et al., "Spy-Resistant Keyboard: Towards More Secure Password Entry on Publicly Observable Touch Screens", OZCHI—Computer-Human Interaction Special Interest Group (CHISIG) of Australia [Online] 2005, pp. 4.
International Search Report and Written Opinion—PCT/US2012/039619—ISA/EPO—Jul. 31, 2012.

*Primary Examiner* — Andrew Nalven
*Assistant Examiner* — Mary Li
(74) *Attorney, Agent, or Firm* — Won Tae C. Kim

(57) ABSTRACT

A method and apparatus is provided for securely obtaining input from a touchscreen. A secure execution environment may be implemented (e.g., at a processor), where the secure execution environment may include a touchscreen driver. A keypad image may be sent from the secure execution environment to be displayed by a touchscreen. An input location may be received at the secure execution environment from the touchscreen driver. Such input location may be converted at the secure execution environment into a character, symbol, or a request to change the keypad image displayed at the touchscreen. In one implementation, the secure execution environment may further implement a display driver which sends the keypad image to the touchscreen. The secure execution environment may implement driver keypad image mapping function that maps the keypad image to a character set.

46 Claims, 26 Drawing Sheets

(56) References Cited

U.S. PATENT DOCUMENTS

| | | |
|---|---|---|
| 2005/0071637 A1 | 3/2005 | Shirakawa |
| 2006/0037067 A1 | 2/2006 | Morris et al. |
| 2008/0209212 A1 | 8/2008 | Ditzman et al. |
| 2008/0301575 A1* | 12/2008 | Fermon .................. 715/773 |
| 2009/0213132 A1 | 8/2009 | Kargman |
| 2009/0254986 A1 | 10/2009 | Harris et al. |
| 2010/0175016 A1 | 7/2010 | Tian et al. |
| 2011/0219459 A1 | 9/2011 | Andreasson |

FOREIGN PATENT DOCUMENTS

| | | |
|---|---|---|
| JP | 2003067337 A | 3/2003 |
| JP | 2005107678 A | 4/2005 |
| JP | 2010092485 A | 4/2010 |
| WO | 0057262 A1 | 9/2000 |

\* cited by examiner

SECURE INPUT VIA A TOUCHSCREEN

CLAIM OF PRIORITY

The present application for patent claims priority to U.S. Provisional Patent Application No. 61/491,086 entitled "Secure Input Via a Touch Screen" filed May 27, 2011, the entire disclosure of which is hereby expressly incorporated by reference herein.

BACKGROUND

1. Field

Various features pertain to securing information entered using an input device, and more particularly, to protecting access to information entered via touchscreen input devices.

2. Background

Many electronic devices are reducing the use of dedicated input devices in favor of multi-use devices, such as touchscreens, which can serve as both input and output devices. This often permits the electronic devices to be smaller in size and/or allow for increased display size. Touchscreens also offer greater flexibility since they permit the appearance and/or configuration of a keypad image (i.e., input device) displayed on the touchscreen to be modified.

With a touchscreen driver it is necessary to display the input device image on the screen that allows the user to know where on the screen to touch for a particular input symbol (e.g. the letter "a"). Contrary to a traditional keyboard or keypad, implementing a touchscreen keyboard or keypad involves two components, an input (the touchscreen) and an output (the display). When implementing a keyboard/keypad, the touchscreen operates as an input device. However, in order to provide the user with feedback about which key has been pressed, some kind of visual feedback is provided. For example, the pressed key's value may be displayed above the touch point, or the shading of the key may change to give the impression that it has been depressed. This type of keyboard/keypad, and any accompanying visual feedback, is often controlled by the high level operating system (HLOS), such as Android® and iOS®. Thus, the HLOS controls the user interface (UI) and may receive events from the touchscreen driver.

However, the HLOS may be susceptible to attacks or hacking, which allow unauthorized access to the information entered on the touchscreen. In a system (e.g., processor) that provides a trusted execution environment (TEE) it may be necessary to have the input pass directly from the hardware to the TEE. This is achieved by transferring control of the input device from the HLOS to the TEE, such that the HLOS has no access to the inputs entered by the user, and the inputs instead are only accessible to the TEE. In the case of a typical physical keyboard/keypad this is fairly straightforward since the only visual feedback the user typically sees is the appearance of a concealment character (e.g., "*") in the display input area, and the physical, tactile feedback of the keyboard/keypad that indicates that a key has been depressed.

However, if the input device is a touchscreen the situation is more complicated since, even if an application operating at the HLOS displays a keyboard/keypad, the driver for the touchscreen is executed in the TEE. Also, the only output a touchscreen typically provides is where the display is being touched (e.g., a coordinate or screen location). (Depending on the complexity of the touchscreen driver, some input gestures such as swiping motions may also be provided.) The mapping of the screen location coordinates to the corresponding actions are typically handled by the HLOS which may control the display and know to what actions and/or keys a particular screen coordinate corresponds to. Even if the touchscreen driver executed on the TEE were to have a mapping between the keys displayed on the screen by the HLOS, such architecture may still not provide secure input because some HLOSs, such as Android®, allow the user to replace the default touchscreen keyboard/keypad with another keyboard/keypad. In such cases the TEE may not know the keyboard/keypad mapping without some mapping information being provided by the HLOS. Since the HLOS cannot be considered secure, the TEE cannot rely on such mapping information provided by the HLOS.

Therefore, there is a need for a secure way to implement an input device using a touchscreen.

SUMMARY

One feature provides for a device that comprises a touchscreen adapted to display an image and receive an input, and a processing circuit communicatively coupled to the touchscreen where the processing circuit is adapted to implement a secure execution environment having a touchscreen driver, provide a first keypad image from the secure execution environment to be displayed by the touchscreen, receive a first input location coordinate at the secure execution environment from the touchscreen driver, and convert the first input location coordinate at the secure execution environment to at least one of a character, a symbol, and/or a request to change the first keypad image displayed at the touchscreen. According to one aspect of the disclosure, the processing circuit is further adapted to convert the first input location coordinate at the secure execution environment to at least one of the character, the symbol, and/or the request to change the first keypad image displayed at the touchscreen using a first keypad image mapping implemented within the secure execution environment. The processing circuit may be further adapted to generate the first keypad image at the secure execution environment prior to providing the first keypad image. According to one aspect, the processing circuit is further adapted to obtain the first keypad image from a secure memory associated with the secure execution environment prior to providing the first keypad image. According to another aspect, the secure execution environment includes a display driver that sends the first keypad image to the touchscreen.

According to one aspect of the disclosure, the processing circuit is further adapted to implement an insecure execution environment, wherein data stored or processed at the secure execution environment is secure from unauthorized access by an application associated with the insecure execution environment. The secure execution environment may be independent of the insecure execution environment. According to one aspect, the insecure execution environment is insecure relative to the secure execution environment. The insecure execution environment may be implemented as a high level operating system. According to one aspect, the first input location coordinate from the touchscreen may bypass the insecure execution environment. According to another aspect, converting the first input location coordinate at the secure execution environment includes converting the first input location coordinate at the secure execution environment to the request to change the first keypad image displayed at the touchscreen, and the processing circuit is further adapted to obtain a plurality of keypad images, the plurality of keypad images including the first keypad image and a second keypad image, provide the plurality of keypad images from the secure execution environment to a display driver associated with the insecure execution environment, and transmit a first request to display the first keypad image to the display driver prior to receiving the first input location coordinate. Moreover, the processing circuit may be further adapted to transmit a second request to display the second keypad image to the display driver after converting the first input location coordinate at the secure execution environment to the request to change the first keypad image displayed at the touchscreen, update a first keypad image mapping corresponding to the first keypad image to a second keypad image mapping corresponding to the second keypad image, receive a second input location coordinate at the secure execution environment from the touchscreen driver, and convert, using the second keypad image mapping, the second input location coordinate at the secure execution environment to a character or a symbol.

According to another aspect, providing the first keypad image may include providing the first keypad image to a display driver associated with the insecure execution environment. As such, the processing circuit may be further adapted to obtain a plurality of keypad images, the plurality of keypad images including the first keypad image, and select the first keypad image of the plurality keypad images prior to providing the first keypad image to the display driver associated with the insecure execution environment. According to one aspect, converting the first input location coordinate at the secure execution environment includes converting the first input location coordinate at the secure execution environment to the request to change the first keypad image displayed at the touchscreen, and the processing circuit may be further adapted to provide a second keypad image of the plurality of keypad images from the secure execution environment to the display driver associated with the insecure execution environment, update a first keypad image mapping corresponding to the first keypad image to a second keypad image mapping corresponding to the second keypad image, receive a second input location coordinate at the secure execution environment from the touchscreen driver, and convert, using the second keypad image mapping, the second input location coordinate at the secure execution environment to a character or a symbol.

Another feature provides for a method operational in a device for secure input using a touchscreen, where the method comprises implementing a secure execution environment having a touchscreen driver, providing a first keypad image from the secure execution environment to be displayed by the touchscreen, receiving a first input location coordinate at the secure execution environment from the touchscreen driver, and converting the first input location coordinate at the secure execution environment to at least one of a character, a symbol, and/or a request to change the first keypad image displayed at the touchscreen.

Another feature provides for a device comprising a means for implementing a secure execution environment having a touchscreen driver, a means for providing a first keypad image from the secure execution environment to be displayed by a touchscreen, a means for receiving a first input location coordinate at the secure execution environment from the touchscreen driver, and a means for converting the first input location coordinate at the secure execution environment to at least one of a character, a symbol, and/or a request to change the first keypad image displayed at the touchscreen. According to one aspect of the disclosure, the device further comprises a means for converting the first input location coordinate at the secure execution environment to at least one of the character, the symbol, and/or the request to change the first keypad image displayed at the touchscreen using a first keypad image mapping associated with the secure execution environment.

Another feature provides for a processor readable medium having one or more instructions operational in a device for secure input using a touchscreen, the instructions which when executed by at least one processor causes the processor to implement a secure execution environment, provide a first keypad image from the secure execution environment to be displayed by the touchscreen, receive a first input location coordinate at the secure execution environment from the touchscreen, and convert the first input location coordinate at the secure execution environment to at least one of a character, a symbol, and/or a request to change the first keypad image displayed at the touchscreen.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "keypad" is used herein to refer to various types of keyboards having, for example, alpha keys, alpha-numeric keys, numeric keys, and/or symbol keys, as well as other types of input devices.

Overview

A method and apparatus is provided for securely obtaining input from a touchscreen. A secure execution environment may be implemented (e.g., at a processor), where the secure execution environment may include a touchscreen input driver. A keypad image may be sent from the secure execution environment to a touchscreen for display. An input location may be received at the secure execution environment from the touchscreen driver. The input location may be converted at the secure execution environment into a character, symbol, or a request to change the keypad image displayed at the touchscreen. The secure execution environment may implement a keypad image mapping that maps the input location coordinates received to a character set and/or action.

In one aspect of the disclosure, an insecure execution environment that includes a display driver may be implemented, for example, at the same processor implementing the secure execution environment. Data stored or processed at the secure execution environment is secure from unauthorized access by an application associated with the insecure execution environment. The secure execution environment may send the keypad image to the insecure execution environment to have the keypad image displayed by the touchscreen. The secure execution environment may be independent of the insecure execution environment, and the insecure execution environment may be insecure relative to the secure execution environment. In another aspect of the disclosure, the secure execution environment may also implement a display driver that provides the keypad image to the touchscreen.

First Exemplary Implementation for Secure Input Via Touchscreen

Figure 1:
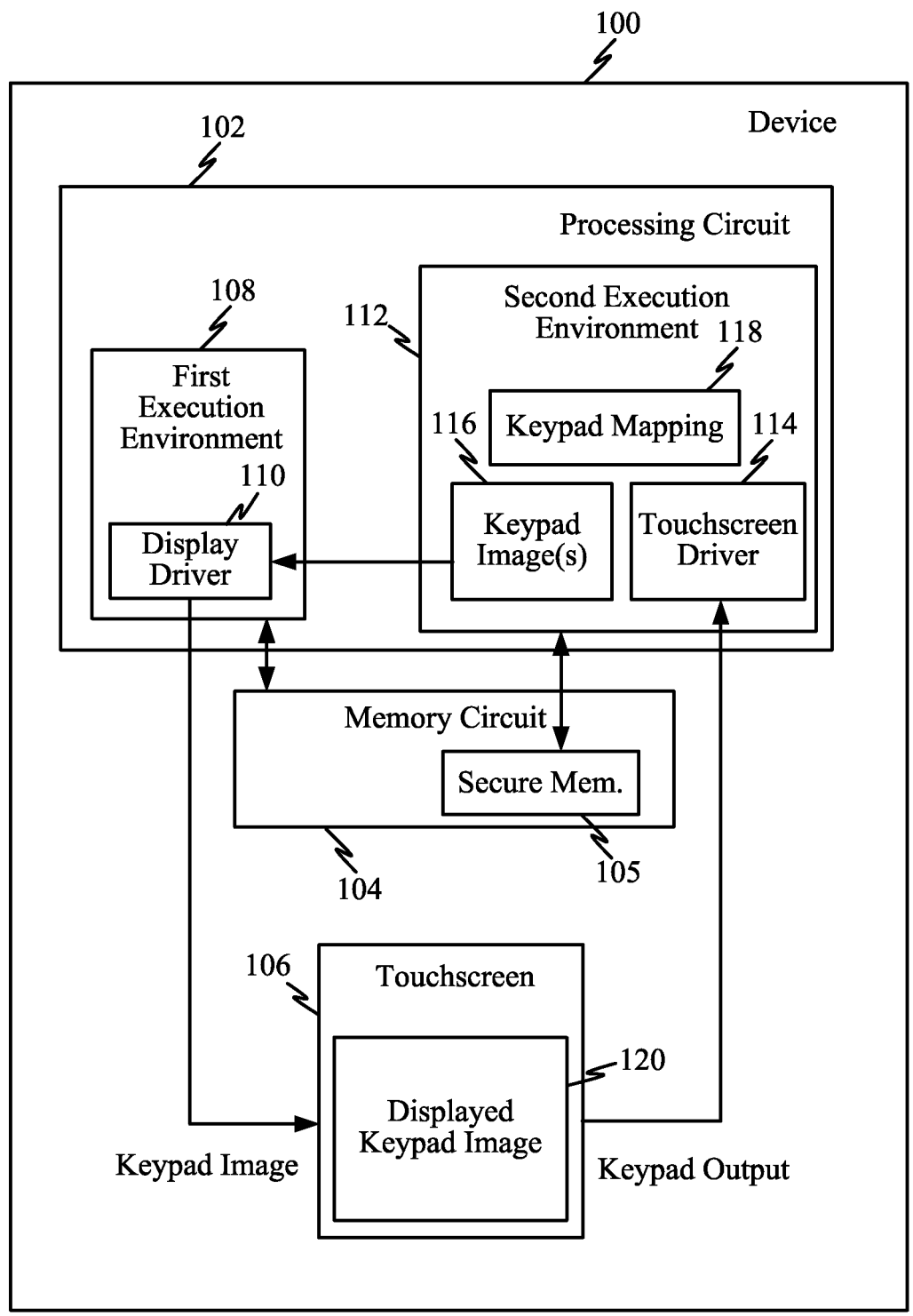
FIG. 1 is a block diagram of a device which may implement a secure input of a touchscreen keypad.

FIG. 1 illustrates a block diagram of a device 100 which may implement a secure input of a touchscreen keypad according to one aspect of the present disclosure. The device 100 may include a processing circuit 102, a memory circuit 104, and/or a touchscreen 106. The processing circuit 102, the memory circuit 104, and the touchscreen 106 may be communicatively and/or electrically coupled together. The processing circuit 102 may be implemented as one or more processing devices (e.g., processors) and may be adapted to operate a first execution environment 108 and a second execution environment 112. The first execution environment 108 and the second execution environment 112 may run in parallel to each other on a single processor. As another example, the first and second execution environments 108, 112 may run in parallel on different processors or processor cores that make up the processing circuit 102. The memory circuit 104 may be implemented as one or more memory devices (e.g., RAM, ROM, volatile memory, non-volatile memory, hard disk drive, etc.). The memory circuit 104 may include a secure memory portion 105 that cannot be easily accessed or modified by applications not associated with the second execution environment 112. The touchscreen 106 may be an electronic visual display that is adapted to receive inputs and also display visual outputs. The touchscreen 106 may act as an input by detecting the presence and location of a human and/or stylus touch within its display area. The touchscreen 106 may be, but is not limited to, a resistive touchscreen, surface acoustic touchscreen, capacitive (e.g., surface, projected, mutual, or self) touchscreen, infrared touchscreen, optical imaging touchscreen, dispersive signal touchscreen, and/or acoustic pulse recognition touchscreen.

The first execution environment 108 (also referred to herein as an "insecure execution environment") may be a high level operating system (HLOS) that may run one or more applications. The first execution environment 108 may be considered "insecure" in that information at the first execution environment 108 may be accessed by unintended parties or applications. For example, a malicious entity may install an application that can snoop on a memory stack, memory space, buffers, registers, and/or data path interface associated with the first execution environment 108 in order to obtain unauthorized access to data and/or information (e.g., passwords, user account information, etc.).

By contrast, the second execution environment 112 (also referred to herein as a "secure execution environment") may be a trusted execution environment that is not easily accessible by applications operating at the insecure execution environment 108 (e.g., applications operating at the HLOS). Thus, the secure execution environment 112 is protected from snooping or unauthorized access that can reveal data or information associated with the secure execution environment 112. The insecure execution environment 108 may interact with the secure execution environment 112 using a prescribed set of interfaces. The functionality of the secure execution environment 112 is typically limited to that provided by the secure execution environment 112 vendor/distributor, and thus it is very difficult to install arbitrary applications in the secure execution environment 112 since it is tightly controlled. One non-limiting example of a secure execution environment is Mobicore® created by Gieseke & Devrient GmbH.

In the example illustrated in FIG. 1, the secure execution environment 112 may execute a touchscreen driver 114 (e.g., input driver, touchscreen input driver, etc.) to process outputs generated by the touchscreen 106. For example, the touchscreen driver receives the electronic signals generated by the touchscreen 106 in response to screen touches by a user and generates screen location coordinates that correspond to the locations on the touchscreen 106 where the user touched. Thus, according to one aspect of the disclosure, the touchscreen driver 114 may be strictly contained and/or executed within the secure execution environment 112 (e.g., touchscreen driver 114 stored within secure memory 105). To provide a secure implementation of a touchscreen input device, the secure execution environment 112 may provide at least one keypad image 116 to the display driver 110 of the insecure execution environment 108. The display driver 110 causes the keypad image 116 to be displayed at the touchscreen 106. According to one aspect of the present disclosure, the secure execution environment 112 generates the keypad image 116. In another aspect, the keypad image 116 is stored within the secure memory portion 105 of the memory circuit 104 and retrieved from the secure memory 105 by the secure execution environment 112.

The keypad image 116 transmitted to the touchscreen 106 is then displayed by the touchscreen 106. The displayed keypad image 120 may then be manipulated by a user to enter data (e.g., user information, account information, password, etc.). For example, using a finger or stylus the user may touch a portion of the touchscreen 106 that corresponds to a desired symbol or key that the user wishes to enter/select. The touchscreen driver 114 then provides location information (e.g., coordinates) of where the touchscreen 106 sensed a touch (e.g., keypad press) to the secure execution environment 112. The location information (e.g., coordinates) may thus bypass the insecure execution environment 108 and be unknown to applications executed within the insecure execution environment 108. A keypad mapping 118 function (e.g., a lookup table) implemented within the secure execution environment 112 then converts the location information into a particular character, symbol, or other input. For example, the location information may include coordinates that map to a specific character or symbol. As another example, the location information may include a series of coordinates that represent a gesture, such as a swiping gesture. In at least one aspect of the disclosure, the keypad mapping 118 is unknown to the insecure execution environment 108 because it strictly resides in the secure execution environment 112. Thus, applications executed within the insecure execution environment 108 may not have access to the keypad mapping 118.

Since the secure execution environment 112 provides the keypad image 116 (e.g., the secure execution environment 112 may be the source of the keypad image 116), the secure execution environment 112 knows each character and/or symbol in the keypad image bounded by a set of location coordinates. Upon receipt of the location information from the touchscreen driver 114, the keypad mapping 118 function may ascertain the key, symbol, or gesture to which such location information corresponds. Thus, instead of relying on a keypad image and/or keypad mapping provided by the insecure execution environment 108, the device 100 utilizes a keypad image 116 and/or keypad mapping 118 provided by the secure execution environment 112 to ensure that the touchscreen input device is self-contained within the secure execution environment 112 and does not rely on the trustworthiness of the insecure execution environment 108.

Figure 2:
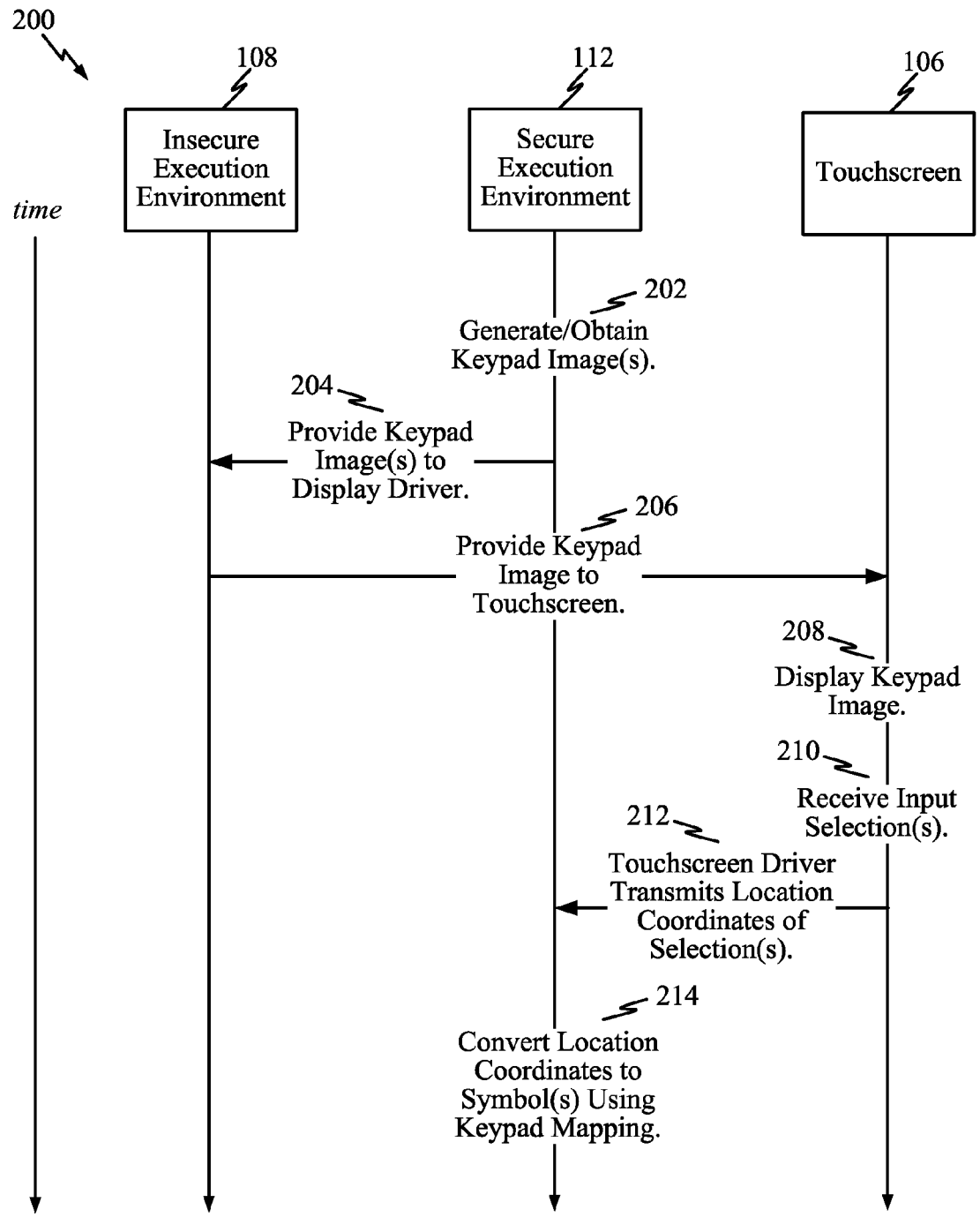
FIGS. 2, 3A, 3B, 4A, and 4B illustrate flow diagrams of a secure input using a touchscreen keypad.

FIG. 2 illustrates a flow diagram 200 of a secure input using a touchscreen keypad according to one aspect of the present disclosure. At step 202, the secure execution environment 112 generates and/or obtains (e.g., from secure memory 105) at least one keypad image. At step 204, the secure execution environment 112 provides/transmits the keypad image(s) to the display driver 110 operating within the insecure execution environment 108. At step 206, the display driver 110 of the insecure execution environment 108 provides a keypad image to the touchscreen display 106. At step 208, the touchscreen 106 displays the keypad image. At step 210, the touchscreen 106 receives at least one keypad image input selection from a user. The selection made corresponds to one or more location coordinates associated with the touchscreen display 106. At step 212, the touchscreen driver 114 transmits/provides the location coordinates associated with the selection(s) to the secure execution environment 112. At step 214, the secure execution environment 112 converts the location coordinates associated with the selection(s) to the corresponding user desired symbol, key, and/or action using the keypad image mapping 118.

Figure 3A:
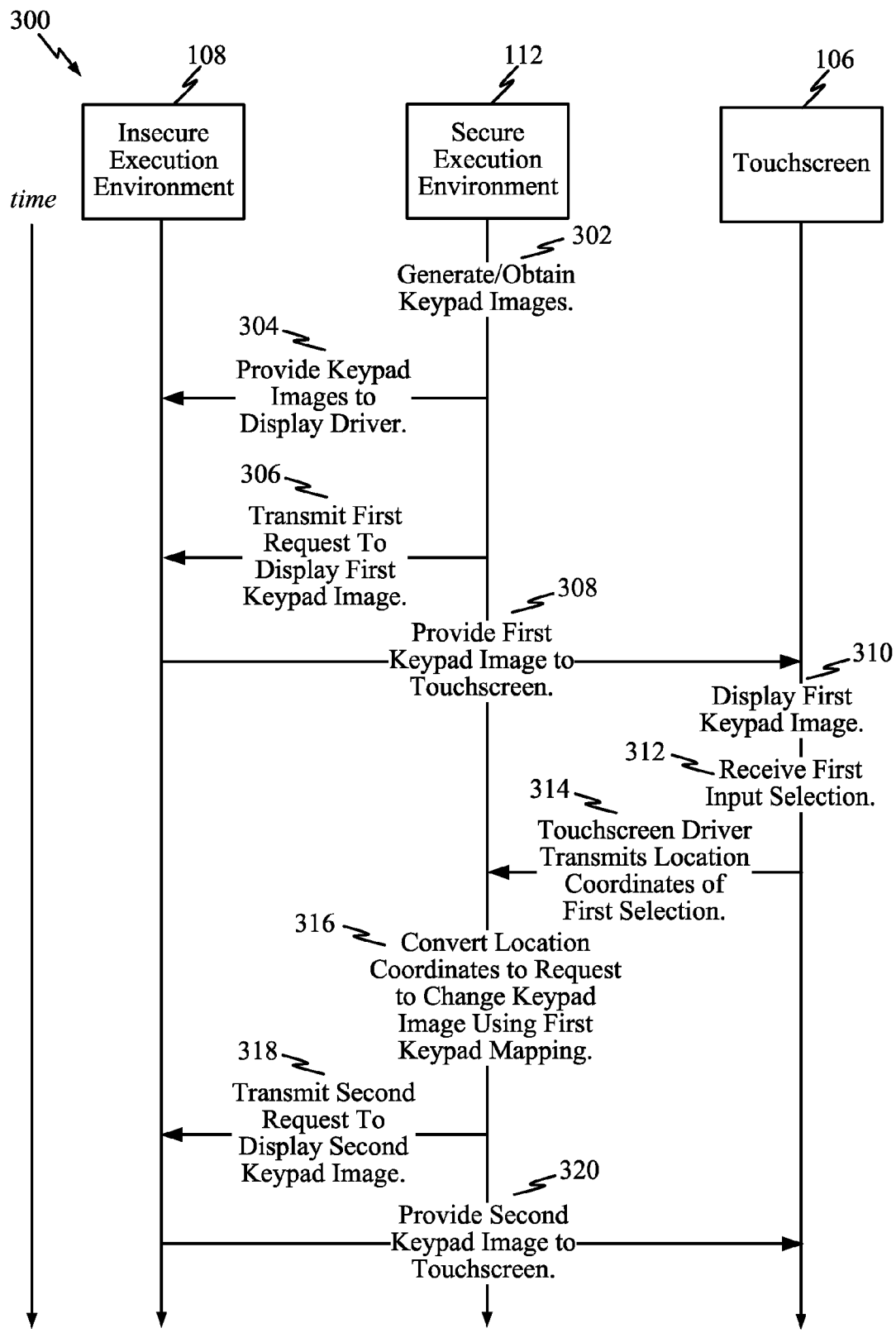
Figure 3B:
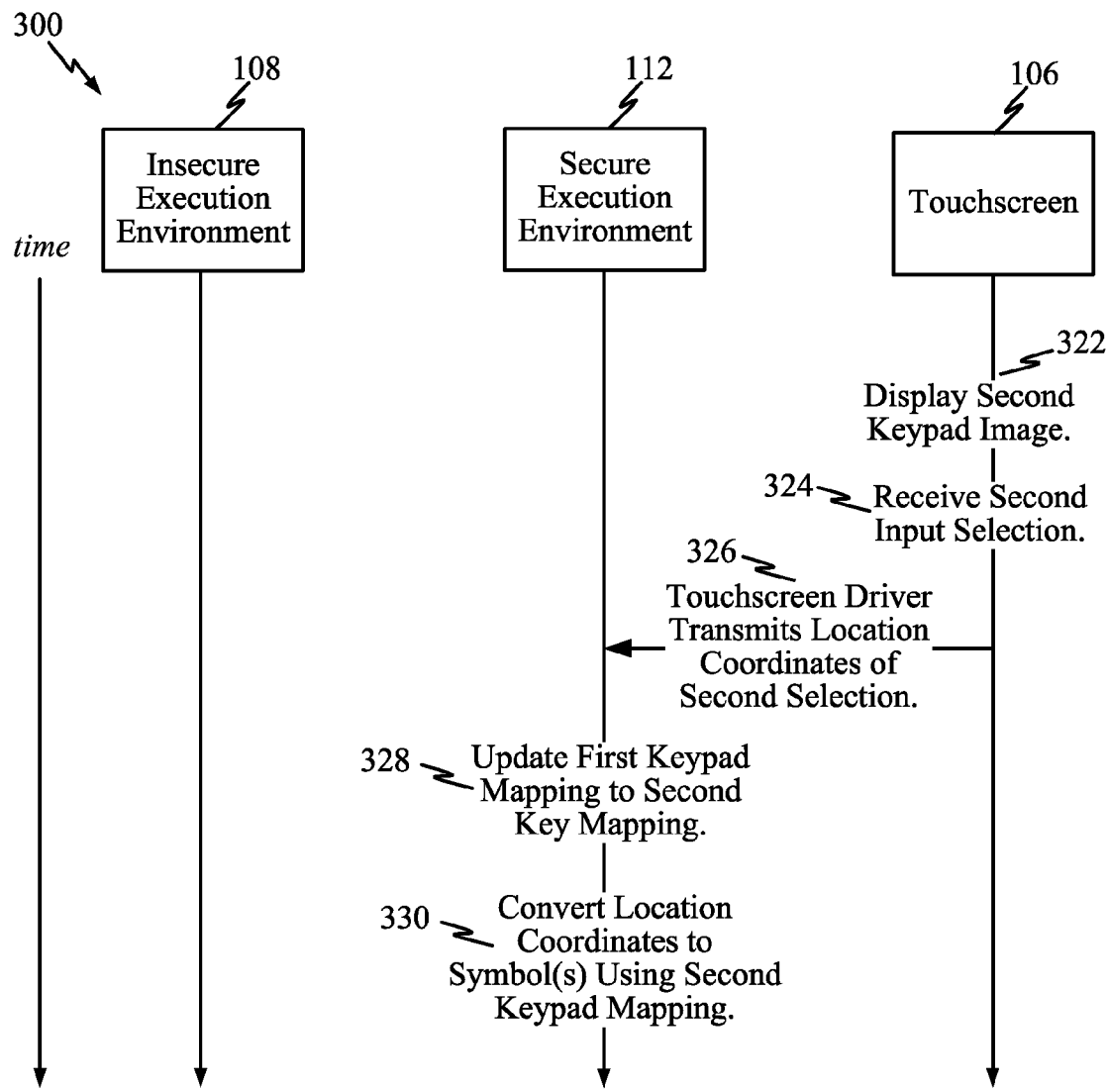

FIGS. 3A and 3B illustrate a flow diagram 300 of a secure input using a touchscreen keypad according to one aspect of the present disclosure. At step 302, the secure execution environment 112 generates and/or obtains (e.g., from secure memory 105) a plurality of keypad images. For example, the plurality of keypad images may include a numeric 0-9 personal identification number (PIN) keypad, a QWERTY style keyboard, a "shifted" version of the QWERTY style keypad, a standard telephone keypad, and/or additional keypads with other symbols. At step 304, the secure execution environment 112 provides/transmits the plurality of keypad images to the display driver 110 operating within the insecure execution environment 108. According to one aspect, the plurality of keypad images are provided to an application requesting secure touchscreen keypad input running within the insecure execution environment 108. At step 306, the secure execution environment 112 provides/transmits a first request to the display driver 110 of the insecure execution environment 108 to display a first keypad image of the plurality of keypad images provided. The request specifies which of the plurality of keypad images the touchscreen 106 should display. According to one aspect, the first request may be sent periodically, or alternatively it may be sent on an as needed basis. At step 308, the display driver 110 of the insecure execution environment 108 provides the first keypad image to the touchscreen display 106. At step 310, the touchscreen 106 displays the first keypad image. At step 312, the touchscreen 106 receives a first keypad image input selection from a user. In this example, the first selection corresponds to a request by the user to change the keypad image to another keypad image of the plurality of keypad images. At step 314, the touchscreen driver 114 transmits/provides the touchscreen location coordinates associated with the first selection to the secure execution environment 112. At step 316, the secure execution environment 112 converts, using a first keypad image mapping, the location coordinates associated with the first selection to a request for changing the keypad image to another keypad image desired by the user.

At step 318, the secure execution environment 112 provides/transmits a second request to the display driver 110 of the insecure execution environment 108 to display a desired, second keypad image of the plurality of keypad images. The second request specifies which of the plurality of keypad images the touchscreen 106 should display. According to one aspect, the second request may be sent periodically, or alternatively it may be sent on an as needed basis. At step 320, the display driver 110 of the insecure execution environment 108 provides the second keypad image to the touchscreen display 106. Referring to FIG. 3B, at step 322, the touchscreen 106 displays the second keypad image. At step 324, the touchscreen 106 receives a second keypad image input selection from the user. In this example, the second selection corresponds to a symbol/character desired by the user. At step 326, the touchscreen driver 114 transmits/provides the touchscreen location coordinates associated with the second selection to the secure execution environment 112. At step 328, the secure execution environment 112 updates its keypad image mapping from the first keypad image mapping to a second keypad image mapping that corresponds to (e.g., associated with) the second keypad image provided to the touchscreen 106 at step 308. According to one aspect, the update step 328 may be performed after step 316, i.e., after converting the location coordinates to a request to change the first keypad image. According to another aspect, the update step 328 may be performed immediately after any one of steps 318, 320, 322, and 324. At step 330, the secure execution environment 112 converts, using the second keypad image mapping, the location coordinates associated with the second selection to the corresponding user desired symbol/character. Thus, the secure execution environment 112 transmits to the insecure execution environment 108 (e.g., an application requesting secure touchscreen keypad input running within the insecure execution environment 108) all the keypad images at once and then later sends requests to change the keypad image as needed or periodically.

Figure 4A:
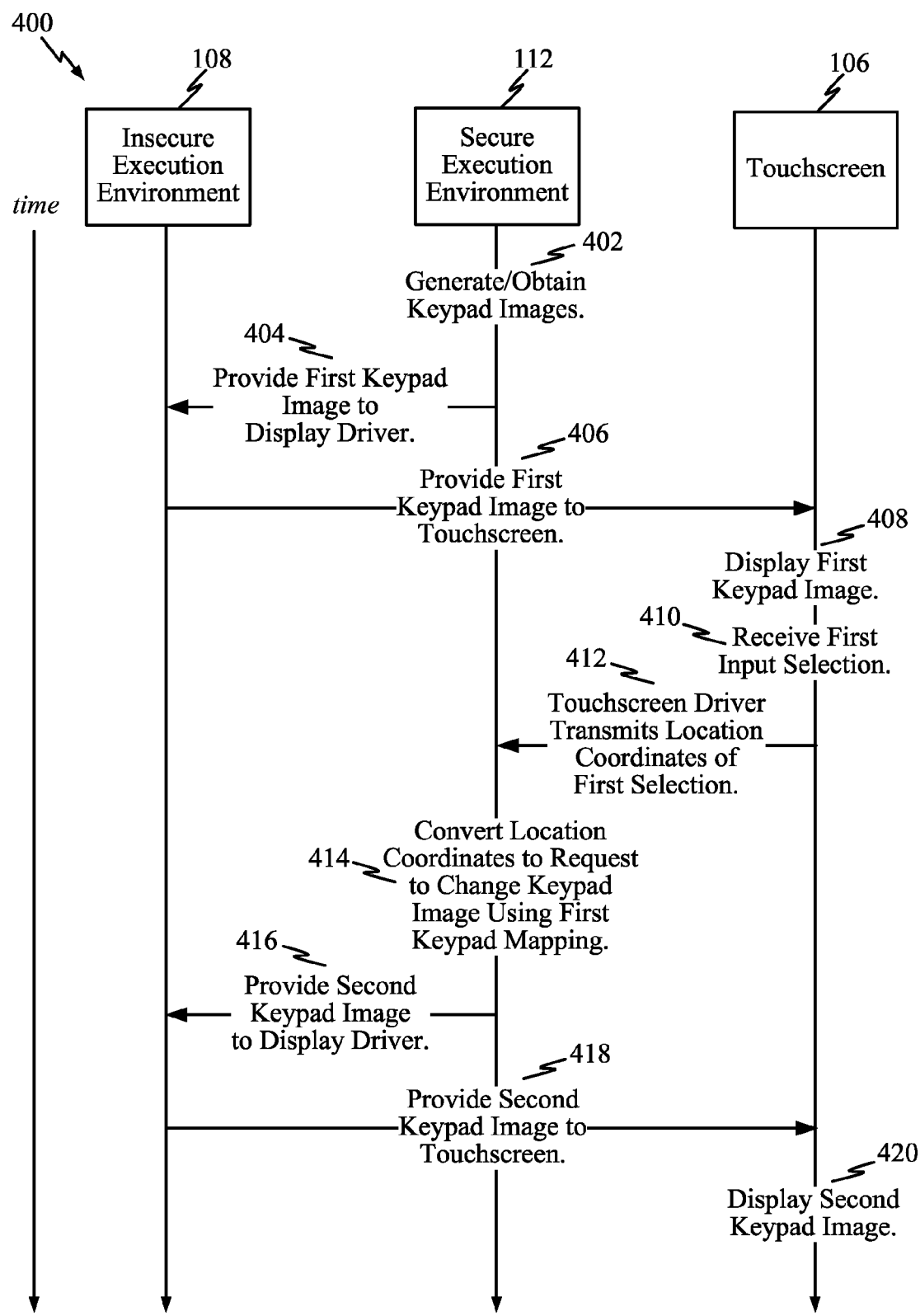
Figure 4B:
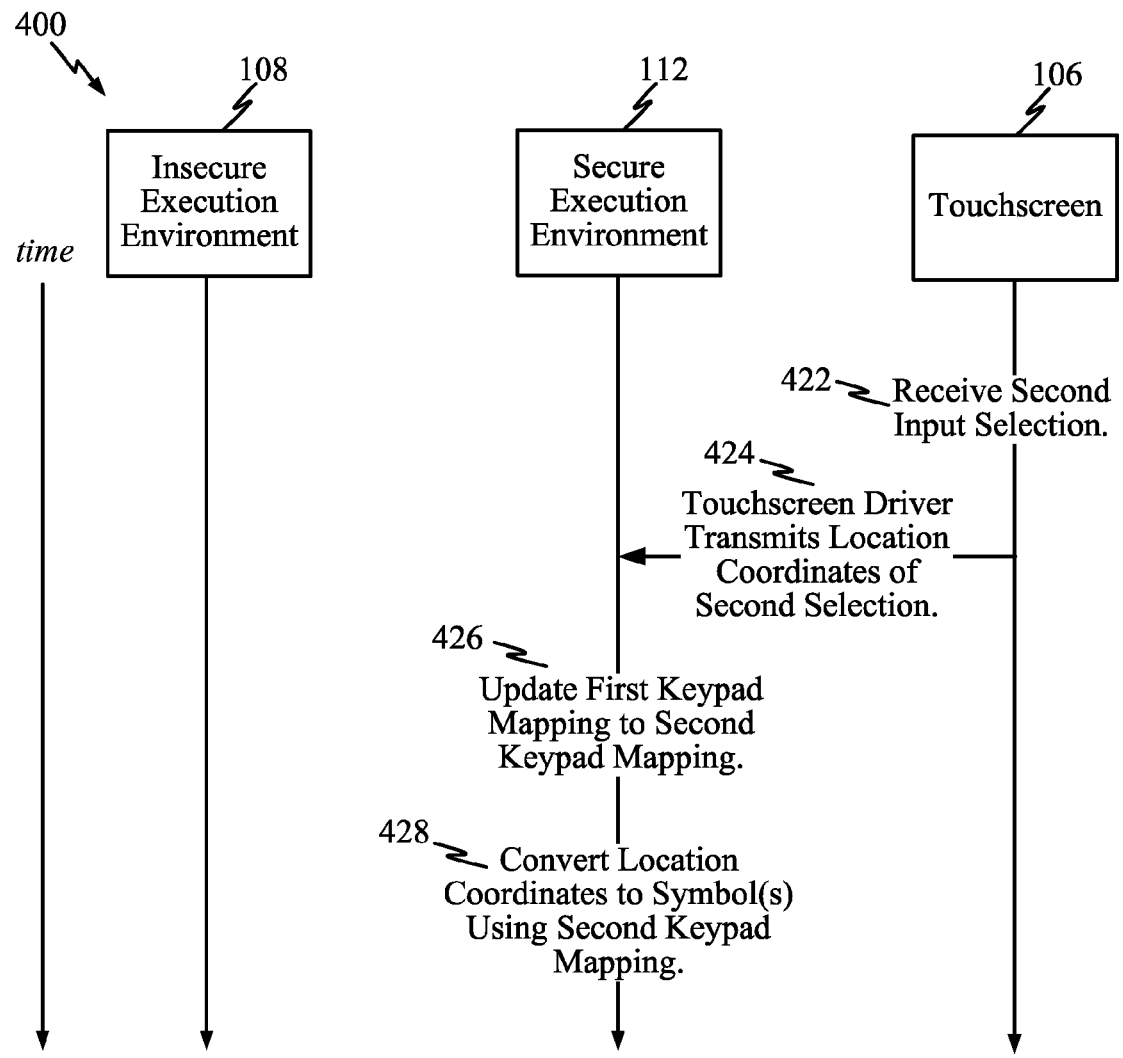

FIGS. 4A and 4B illustrate a flow diagram 400 of a secure input using a touchscreen keypad according to one aspect of the present disclosure. At step 402, the secure execution environment 112 generates and/or obtains (e.g., from secure memory 105) a plurality of keypad images. For example, the plurality of keypad images may include a numeric 0-9 personal identification number (PIN) keypad, a QWERTY style keyboard, a "shifted" version of the QWERTY style keypad, a standard telephone keypad, and/or additional keypads with other symbols. At step 404, the secure execution environment 112 provides/transmits a first keypad image to the display driver 110 operating within the insecure execution environment 108. According to one aspect, the first keypad image is provided to an application requesting secure touchscreen keypad input running within the insecure execution environment 108. At step 406, the display driver 110 of the insecure execution environment 108 provides the first keypad image to the touchscreen display 106. At step 408, the touchscreen 106 displays the first keypad image. At step 410, the touchscreen 106 receives a first keypad image input selection from a user. In this example, the first selection corresponds to a request by the user to change the keypad image to another keypad image of the plurality of keypad images. At step 412, the touchscreen driver 114 transmits/provides the touchscreen location coordinates associated with the first selection to the secure execution environment 112. At step 414, the secure execution environment 112 converts, using a first keypad image mapping, the location coordinates associated with the first selection to a request for changing the keypad image to another keypad image desired by the user.

At step 416, the secure execution environment 112 provides/transmits a second keypad image to the display driver 110 of the insecure execution environment 108 to display a desired, second keypad image of the plurality of keypad images. At step 418, the display driver 110 of the insecure execution environment 108 provides the second keypad image to the touchscreen display 106. At step 420, the touchscreen 106 displays the second keypad image. Referring to FIG. 4B, at step 422, the touchscreen 106 receives a second keypad image input selection from the user. In this example, the second selection corresponds to a symbol/character desired by the user. At step 424, the touchscreen driver 114 transmits/provides the touchscreen location coordinates associated with the second selection to the secure execution environment 112. At step 426, the secure execution environment 112 updates its keypad image mapping from the first keypad image mapping to a second keypad image mapping that corresponds to (e.g., associated with) the second keypad image provided to the touchscreen 106 at step 406. According to one aspect, the update step 426 may be performed after step 414, i.e., after converting the location coordinates to a request to change the first keypad image. According to another aspect, the update step 426 may be performed immediately after any one of steps 416, 418, 420, and 422. At step 428, the secure execution environment 112 converts, using the second keypad image mapping, the location coordinates associated with the second selection to the corresponding user desired symbol/character. Thus, the secure execution environment 112 transmits keypad images to the insecure execution environment 108 (e.g., an application requesting secure touchscreen keypad input running within the insecure execution environment 108) for display on the touchscreen 106 as the need for that specific keypad image arises.

Since the secure execution environment 112 knows when a keypad image change is made, it can update its keypad image mapping to the appropriate map. This allows the secure execution environment 112 to know which keys are being pressed without having to store and/or execute a user interface driver. Rather, a user interface driver may be executed by the insecure execution environment 108 (e.g., executed by a high level operating system). Storing and or executing a user interface driver at the secure execution environment 112 may be undesirable in some applications since the secure execution environment 112 may have limited resources, such as secure memory 105, which can be expensive to implement.

Figure 5:
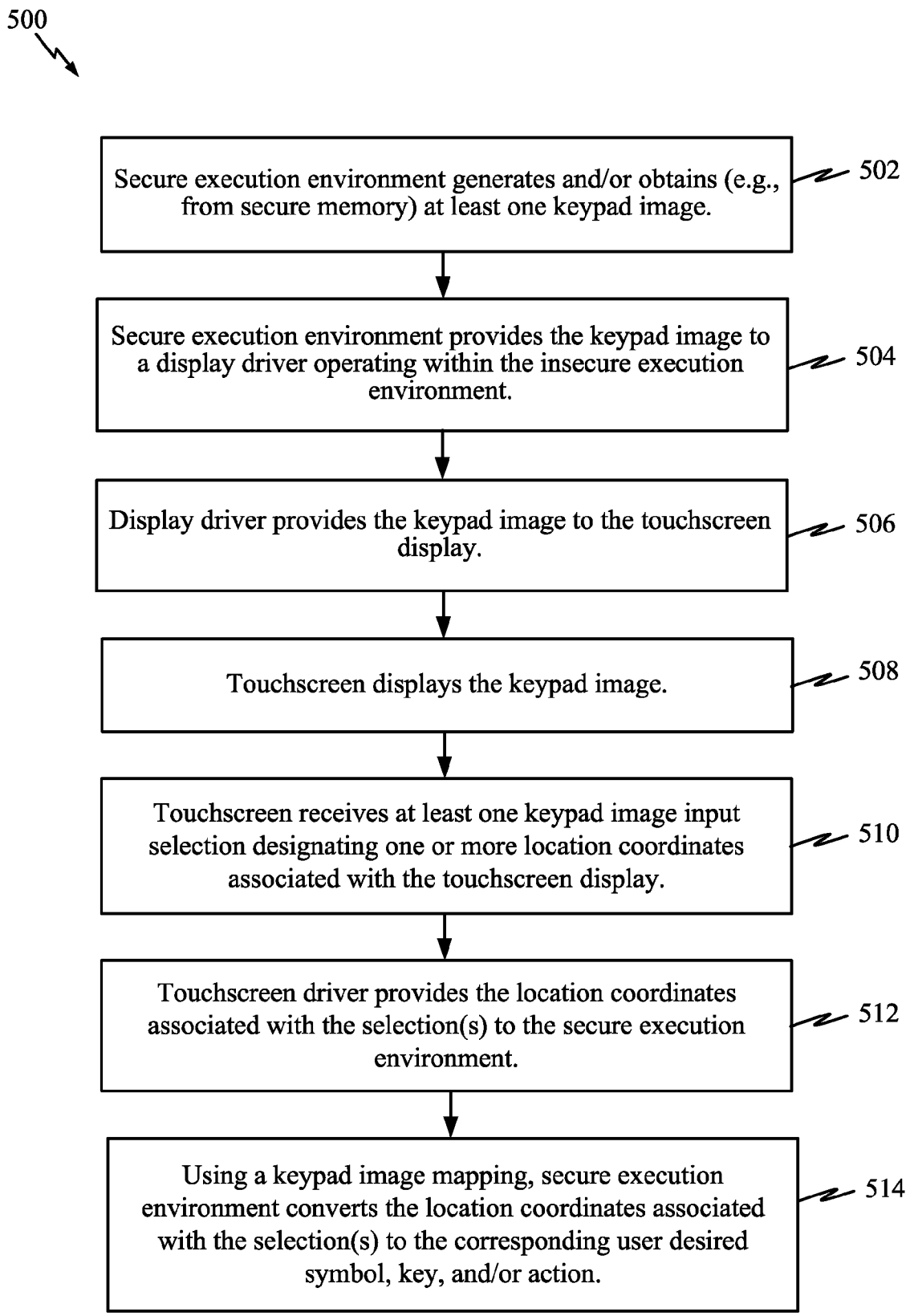
FIGS. 5, 6A, 6B, 7A, 7B, and 8 illustrate flow diagrams of methods operational in a processing circuit of a device for securely obtaining inputs from a touchscreen.

FIG. 5 illustrates a flow diagram 500 of a method operational in a processing circuit 102 (See FIG. 1) of a device 100 for securely obtaining inputs from a touchscreen 106 according to one aspect of the present disclosure. The processing circuit 102 may include two or more separate processing systems or environments, such as an insecure execution environment 108 (e.g., a high level operating system) and a secure execution environment 112 (e.g., a trusted execution environment). Referring to FIG. 5, at step 502, the secure execution environment generates and/or obtains (e.g., from secure memory) at least one keypad image. At step 504, the secure execution environment provides the keypad image to a display driver operating within the insecure execution environment. At step 506, the display driver provides the keypad image to the touchscreen display. At step 508, the touchscreen displays the keypad image. At step 510, the touchscreen receives at least one keypad image input selection designating one or more location coordinates associated with the touchscreen display. At step 512, the touchscreen display provides the location coordinates associated with the selection(s) to the secure execution environment. At step 514, the secure execution environment converts the location coordinates associated with the selection(s) to the corresponding user desired symbol, key, and/or action by using a keypad image mapping.

Figure 6A:
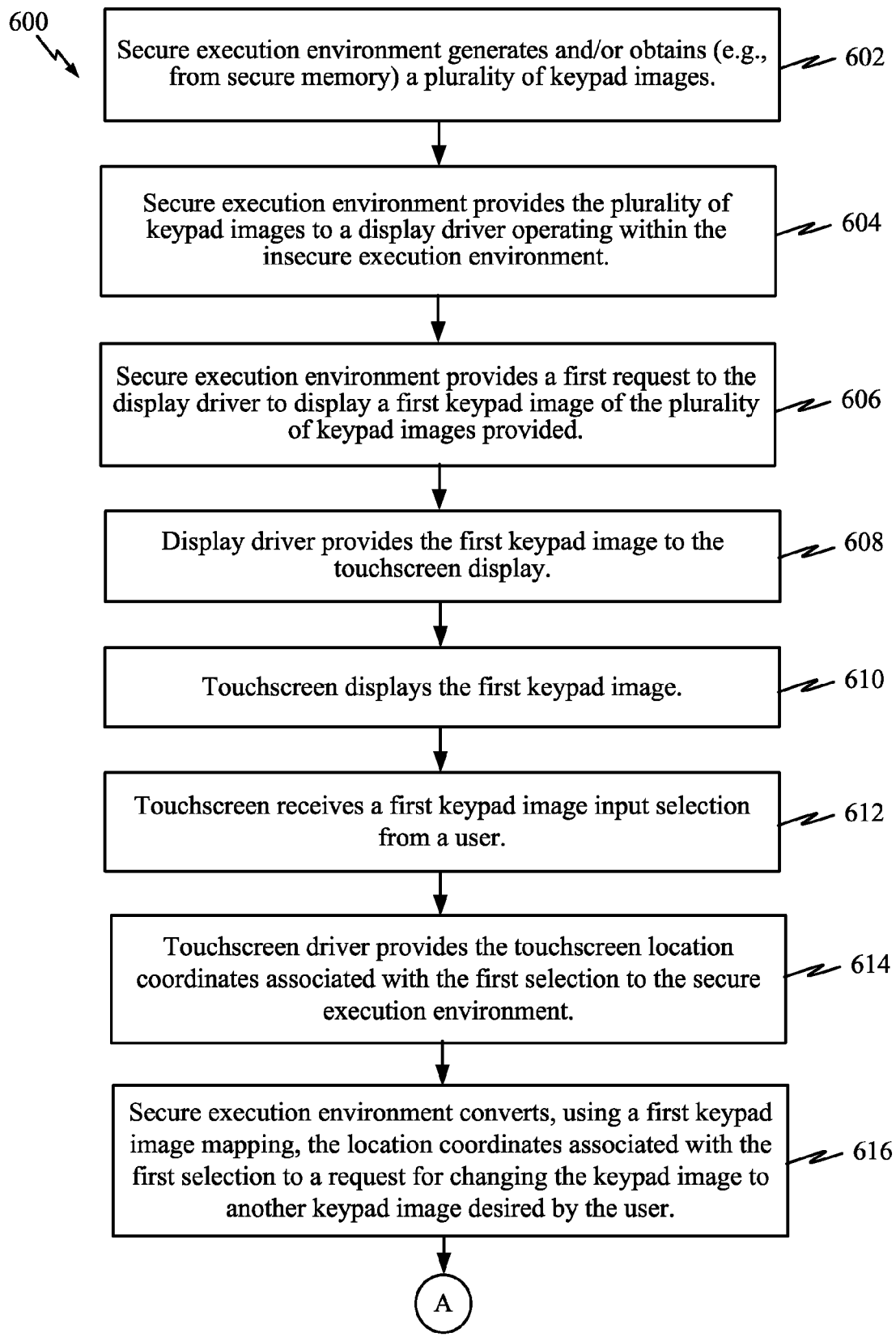
Figure 6B:
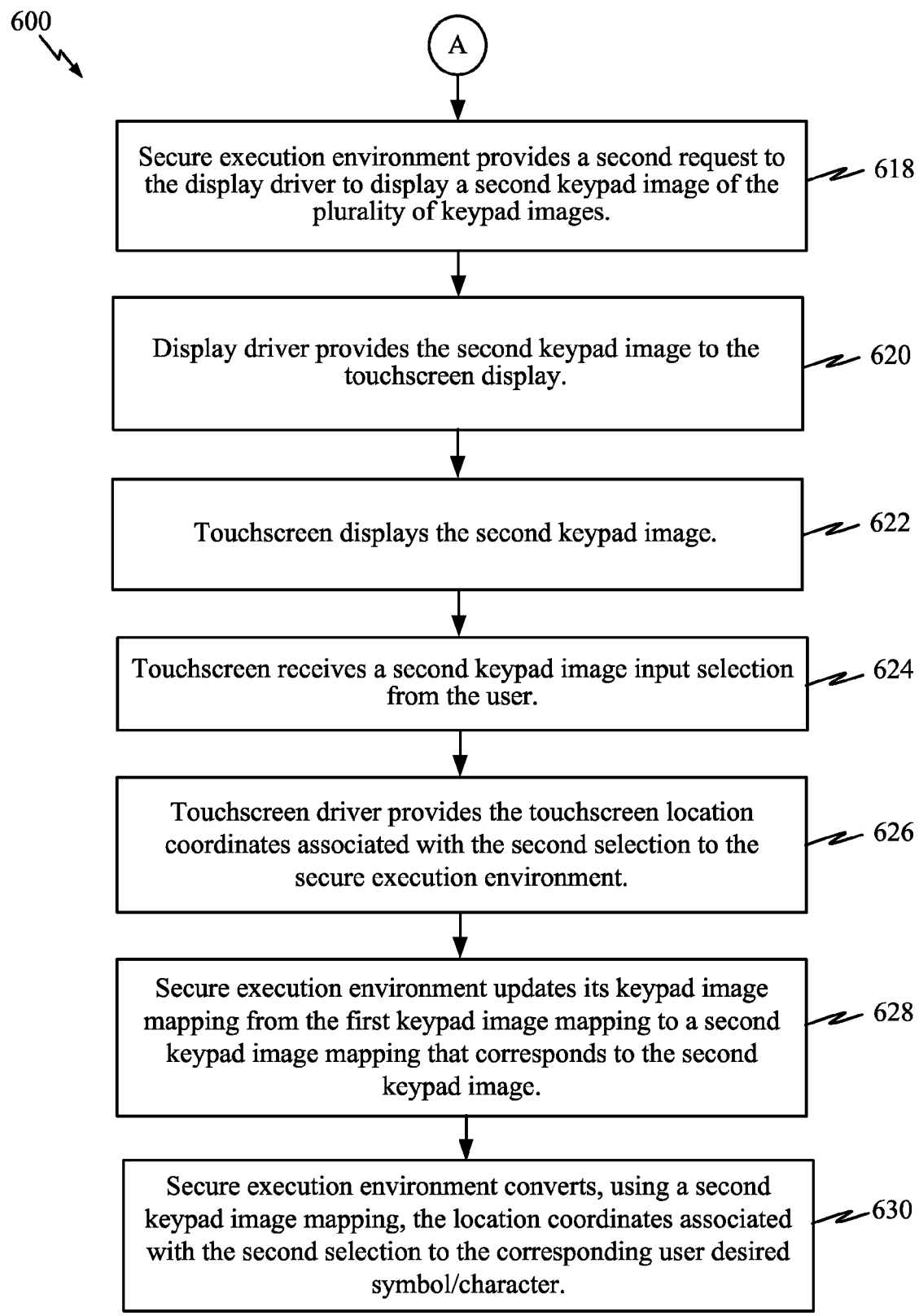

FIGS. 6A and 6B illustrate a flow diagram 600 of a method operational in a processing circuit 102 (See FIG. 1) of a device 100 for securely obtaining inputs from a touchscreen 106 according to one aspect of the present disclosure. The processing circuit 102 may include two or more separate processing systems or environments, such as an insecure execution environment 108 (e.g., a high level operating system) and a secure execution environment 112 (e.g., a trusted execution environment). Referring to FIG. 6A, at step 602, the secure execution environment generates and/or obtains (e.g., from secure memory) a plurality of keypad images. For example, the plurality of keypad images may include a numeric 0-9 personal identification number (PIN) keypad, a QWERTY style keyboard, a "shifted" version of the QWERTY style keypad, a standard telephone keypad, and/or additional keypads with other symbols. At step 604, the secure execution environment provides the plurality of keypad images to a display driver operating within the insecure execution environment. According to one aspect, the plurality of keypad images are provided to an application requesting secure touchscreen keypad input running within the insecure execution environment. At step 606, the secure execution environment provides a first request to the display driver to display a first keypad image of the plurality of keypad images provided. The request specifies which of the plurality of keypad images the touchscreen 106 should display. According to one aspect, the first request may be sent periodically, or alternatively it may be sent on an as needed basis.

At step 608, the display driver provides the first keypad image to the touchscreen display. At step 610, the touchscreen displays the first keypad image. At step 612, the touchscreen receives a first keypad image input selection from a user. In this example, the first selection corresponds to a request by the user to change the keypad image to another keypad image of the plurality of keypad images. At step 614, the touchscreen driver provides the touchscreen location coordinates associated with the first selection to the secure execution environment. At step 616, the secure execution environment converts, using a first keypad image mapping, the location coordinates associated with the first selection to a request for changing the keypad image to another keypad image desired by the user.

Referring to FIG. 6B, at step 618, the secure execution environment provides a second request to the display driver to display a second keypad image of the plurality of keypad images. The second request specifies which of the plurality of keypad images the touchscreen should display. According to one aspect, the second request may be sent periodically, or alternatively it may be sent on an as needed basis. At step 620, the display driver provides the second keypad image to the touchscreen display. At step 622, the touchscreen displays the second keypad image. At step 624, the touchscreen receives a second keypad image input selection from the user. In this example, the second selection corresponds to a symbol/character desired by the user. At step 626, the touchscreen driver provides the touchscreen location coordinates associated with the second selection to the secure execution environment. At step 628, the secure execution environment updates its keypad image mapping from the first keypad image mapping to a second keypad image mapping that corresponds to (e.g., associated with) the second keypad image. According to one aspect, the update step 628 may be performed after step 616, i.e., after converting the location coordinates to a request to change the first keypad image. According to another aspect, the update step 628 may be performed immediately after any one of steps 618, 620, 622, and 624. At step 630, the secure execution environment converts, using the second keypad image mapping, the location coordinates associated with the second selection to the corresponding user desired symbol/character.

Figure 7A:
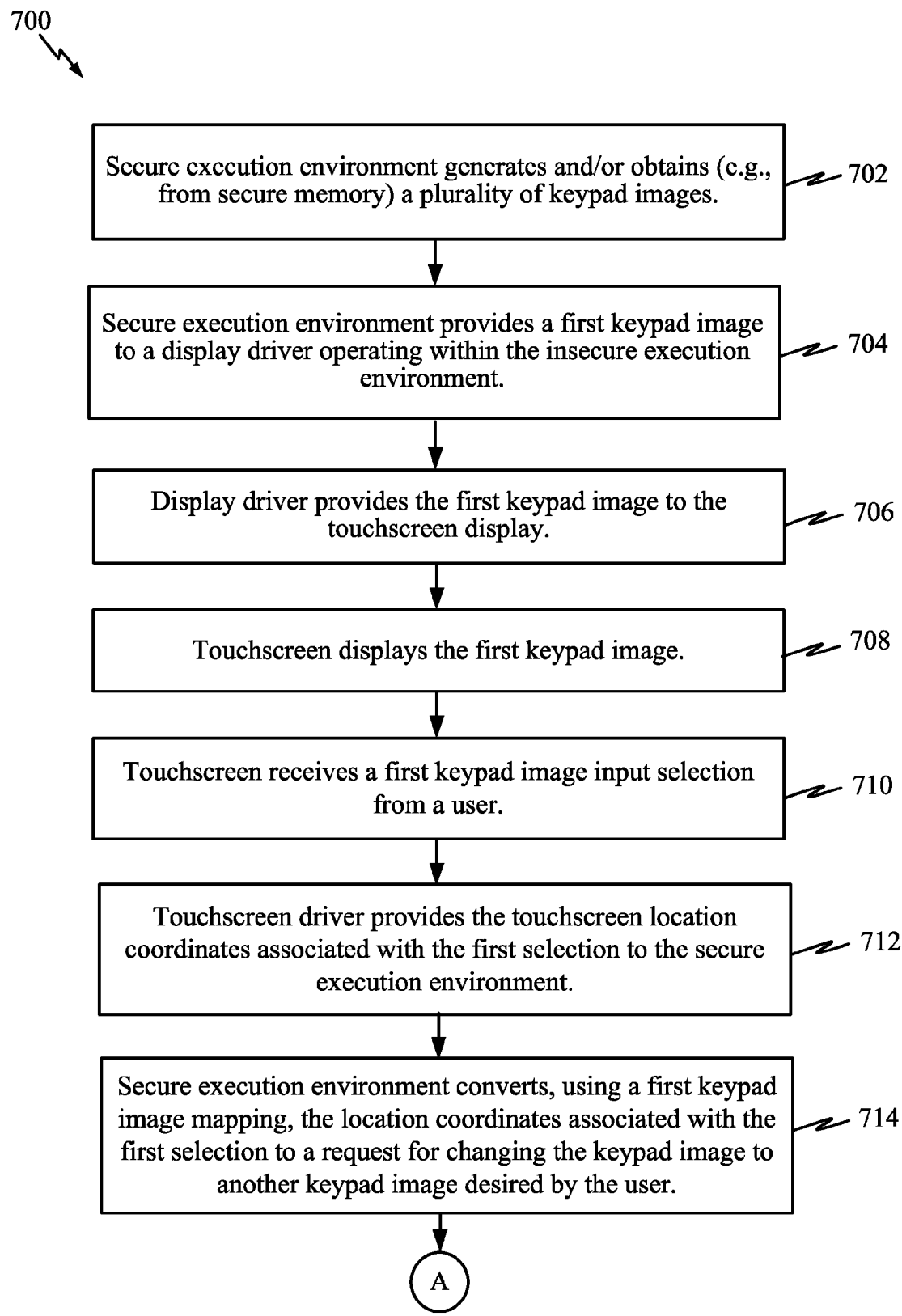
Figure 7B:
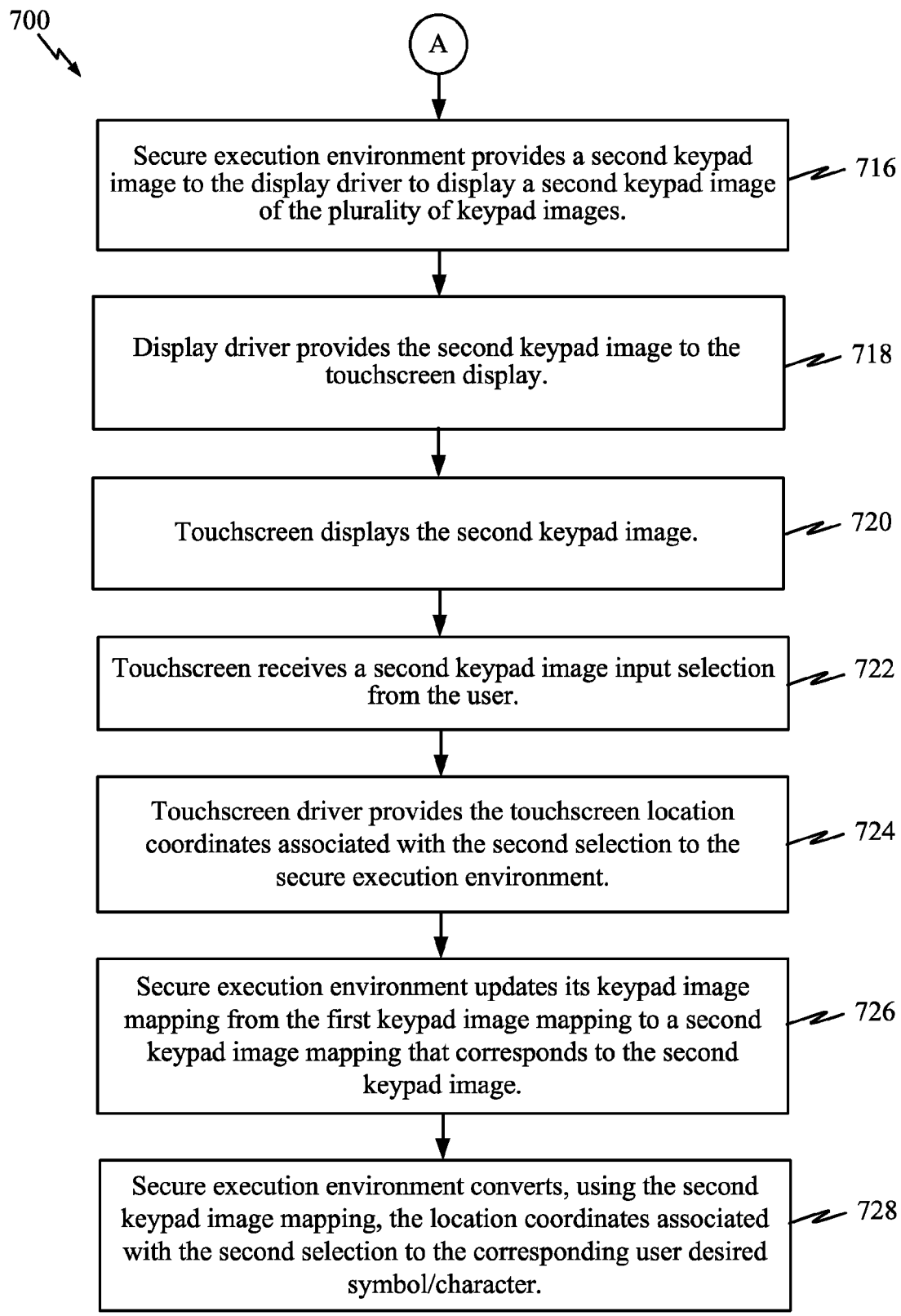

FIGS. 7A and 7B illustrate a flow diagram 700 of a method operational in a processing circuit 102 (See FIG. 1) of a device 100 for securely obtaining inputs from a touchscreen 106 according to one aspect of the present disclosure. The processing circuit 102 may include two or more separate processing systems or environments, such as an insecure execution environment 108 (e.g., a high level operating system) and a secure execution environment 112 (e.g., a trusted execution environment). Referring to FIG. 7A, at step 702, the secure execution environment generates and/or obtains (e.g., from secure memory) a plurality of keypad images. For example, the plurality of keypad images may include a numeric 0-9 personal identification number (PIN) keypad, a QWERTY style keyboard, a "shifted" version of the QWERTY style keypad, a standard telephone keypad, and/or additional keypads with other symbols. At step 704, the secure execution environment provides a first keypad image to a display driver operating within the insecure execution environment. According to one aspect, the first keypad image is provided to an application requesting secure touchscreen keypad input running within the insecure execution environment. At step 706, the display driver provides the first keypad image to the touchscreen display. At step 708, the touchscreen displays the first keypad image. At step 710, the touchscreen receives a first keypad image input selection from a user. In this example, the first selection corresponds to a request by the user to change the keypad image to another keypad image of the plurality of keypad images. At step 712, the touchscreen driver provides the touchscreen location coordinates associated with the first selection to the secure execution environment. At step 714, the secure execution environment converts, using a first keypad image mapping, the location coordinates associated with the first selection to a request for changing the keypad image to another keypad image desired by the user.

Referring to FIG. 7B, at step 716, the secure execution environment provides a second keypad image to the display driver to display a second keypad image of the plurality of keypad images. At step 718, the display driver provides the second keypad image to the touchscreen display. At step 720, the touchscreen displays the second keypad image. At step 722, the touchscreen receives a second keypad image input selection from the user. In this example, the second selection corresponds to a symbol/character desired by the user. At step 724, the touchscreen driver provides the touchscreen location coordinates associated with the second selection to the secure execution environment. At step 726, the secure execution environment updates its keypad image mapping from the first keypad image mapping to a second keypad image mapping that corresponds to (e.g., associated with) the second keypad image. According to one aspect, the update step 726 may be performed after step 714, i.e., after converting the location coordinates to a request to change the first keypad image. According to another aspect, the update step 726 may be performed immediately after any one of steps 716, 718, 720, and 722. At step 728, the secure execution environment converts, using the second keypad image mapping, the location coordinates associated with the second selection to the corresponding user desired symbol/character.

Figure 8:
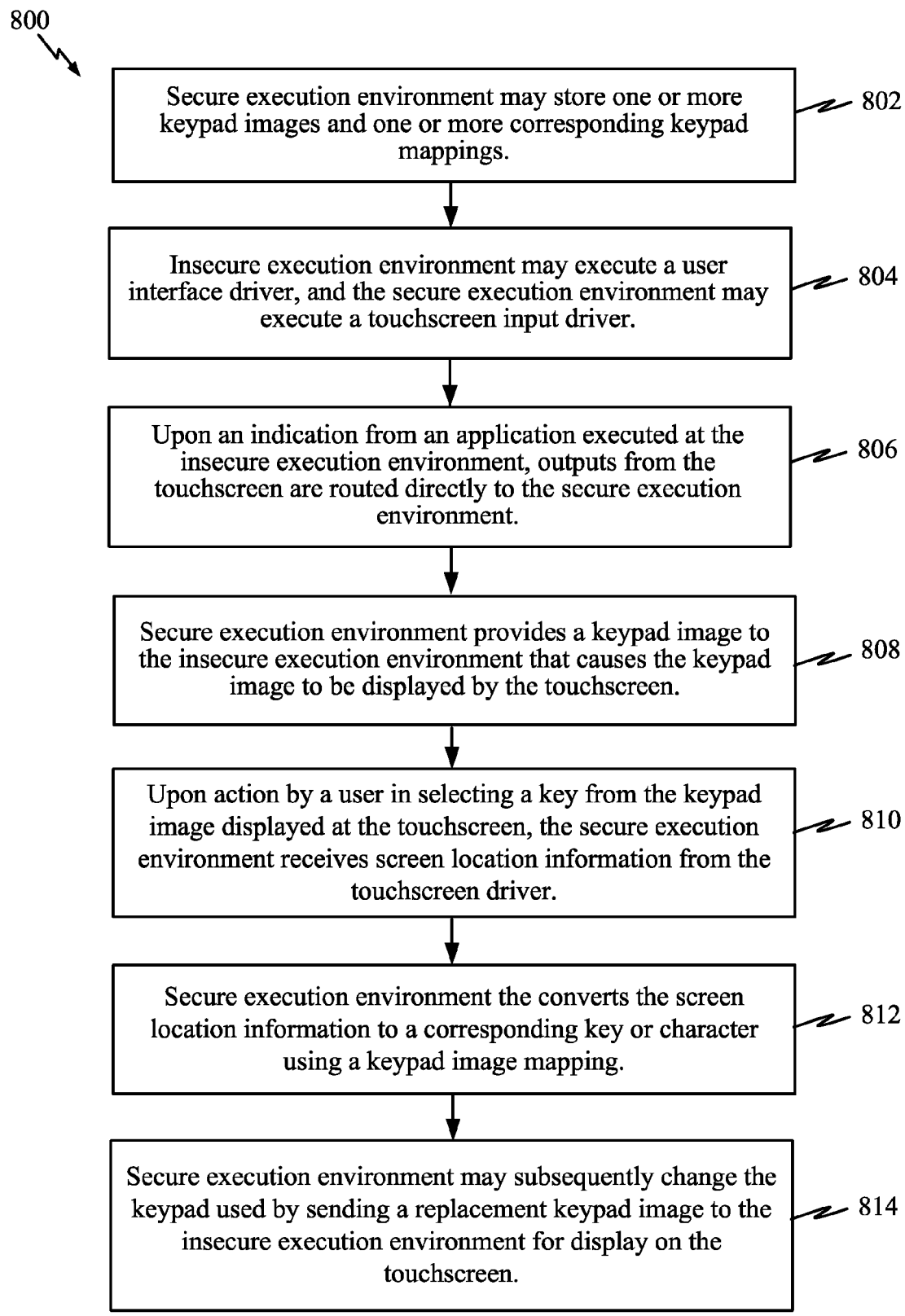

FIG. 8 illustrates a flow diagram 800 of a method operational in a processing circuit 102 (See FIG. 1) of a device 100 for securely obtaining inputs from a touchscreen 106 according to one aspect of the present disclosure. The processing circuit 102 may include two or more separate processing systems or environments, such as an insecure execution environment 108 (e.g., a high level operating system) and a secure execution environment 112 (e.g., a trusted execution environment). Referring to FIG. 8, at step 802, the secure execution environment may store one or more keypad images and one or more corresponding keypad mappings. At step 804, the insecure execution environment may execute a user interface driver, and the secure execution environment may execute a touchscreen input driver. At step 806, upon an indication from an application executed at the insecure execution environment, outputs from the touchscreen are routed directly to the secure execution environment. At step 808, the secure execution environment provides a keypad image to the insecure execution environment that causes the keypad image to be displayed by the touchscreen. At step 810, upon action by a user in selecting a key from the keypad image displayed at the touchscreen, the secure execution environment receives screen location information from the touchscreen driver. The screen location information corresponds to the selected key. At step 812, the secure execution environment the converts the screen location information to a corresponding key or character using a keypad image mapping. At step 814, the secure execution environment may subsequently change the keypad used by sending a replacement keypad image to the insecure execution environment for display on the touchscreen.

Second Exemplary Implementation for Secure Input Via Touch Screen

Figure 9:
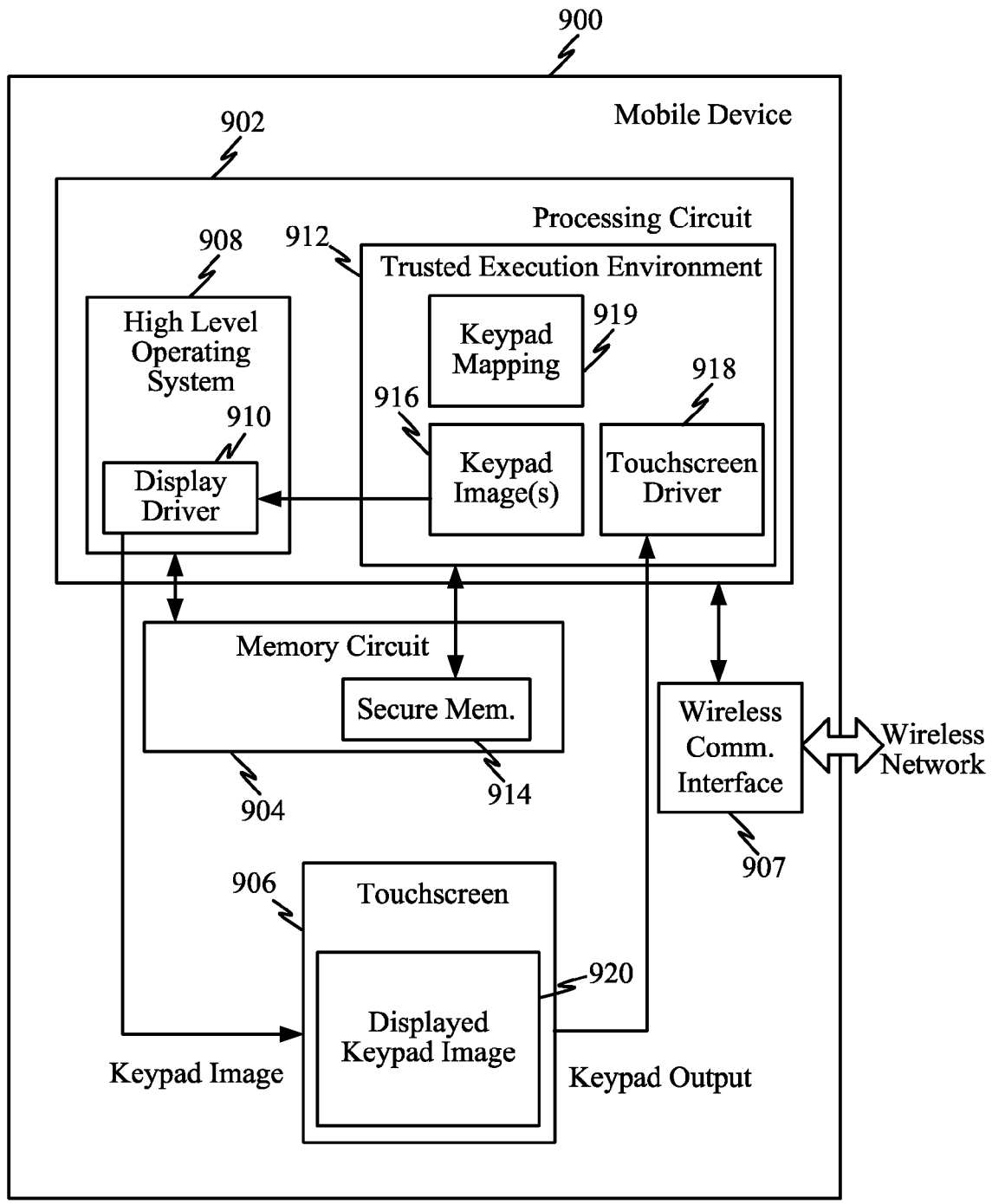
FIG. 9 illustrates a block diagram of a mobile device which may implement a secure input of a touchscreen keypad.

FIG. 9 illustrates a block diagram of a mobile device 900 which may implement a secure input of a touchscreen keypad according to one aspect of the present disclosure. The mobile device 900 (e.g., mobile phone, smartphone, laptop computer, tablet, wireless communication device, etc.) may include a processing circuit 902, a memory circuit 904, a touchscreen 906, and/or a wireless communication interface 907. The processing circuit 902, the memory circuit 904, the touchscreen 906, and the wireless communication interface 907 may be communicatively and/or electrically coupled together. The processing circuit 902 may be implemented as one or more processing devices (e.g., processors) and may be adapted to operate a high level operating system 908 and a trusted execution environment 912. The high level operating system 908 and the trusted execution environment 912 may run in parallel to each other on a single processor. As another example, the high level operating system 908 and the trusted execution environment 912 may run in parallel on different processors or processor cores that make up the processing circuit 902. The memory circuit 904 may be implemented as one or more memory devices (e.g., RAM, ROM, volatile memory, non-volatile memory, hard disk drive, etc.). The memory circuit 904 may include a secure memory portion 914 that cannot be easily accessed or modified by applications not associated with the trusted execution environment 912. The touchscreen 906 may be an electronic visual display that is adapted to receive inputs and also display visual outputs. The touchscreen 906 may act as an input device by detecting the presence and location of a human and/or stylus touch within its display area. The touchscreen 906 may be, but is not limited to, a resistive touchscreen, surface acoustic touchscreen, capacitive (e.g., surface, projected, mutual, or self) touchscreen, infrared touchscreen, optical imaging touchscreen, dispersive signal touchscreen, and/or acoustic pulse recognition touchscreen. The wireless communication interface 907 may serve to communicatively couple the mobile device 900 to a wireless network through which it can send and/or receive data.

The high level operating system (HLOS) 908 (also referred to herein as an "insecure execution environment") may run one or more applications. The HLOS 908 may be considered "insecure" in that information at the HLOS 908 may be accessed by unintended parties or applications. For example, a malicious entity may install an application that can snoop on a memory stack, memory space, buffers, registers, and/or data path interface associated with the HLOS 908 in order to obtain unauthorized access to data and/or information (e.g., passwords, user account information, etc.).

By contrast, the trusted execution environment (TEE) 912 (also referred to herein as a "secure execution environment") is not easily accessible by applications operating at the HLOS 908. Thus, the TEE 912 is protected from snooping or unauthorized access that can reveal data or information associated with the TEE 912. The HLOS 908 may interact with the TEE 912 using a prescribed set of interfaces. The functionality of the TEE 912 is typically limited to that provided by the TEE 912 vendor/distributor, and thus it is very difficult to install arbitrary applications in the TEE 912 since it is tightly controlled. One non-limiting example of a TEE is Mobicore® created by Gieseke & Devrient GmbH.

In the example illustrated in FIG. 9, the TEE 912 may execute a touchscreen driver 918 (e.g., input driver) to process outputs generated by the touchscreen 906. For example, the touchscreen driver receives the electronic signals generated by the touchscreen 906 in response to screen touches by a user and generates screen location coordinates that correspond to the locations on the touchscreen 906 where the user touched. Thus, according to one aspect of the disclosure, the touchscreen driver 918 may be strictly contained and/or executed within the trusted execution environment 912 (e.g., touchscreen driver 918 stored within secure memory 914). To provide a secure implementation of a touchscreen input device, the TEE 912 may provide at least one keypad image 916 to the display driver 910 executed at the HLOS 908. The display driver 910 causes the keypad image 916 to be displayed at the touchscreen 906. According to one aspect of the present disclosure, the TEE 912 generates the keypad image 916. In another aspect, the keypad image 916 is stored within the secure memory portion 914 of the memory circuit 904 and retrieved from the secure memory 914 by the TEE 912.

The keypad image 916 transmitted to the touchscreen 906 is then displayed by the touchscreen 906. The displayed keypad image 920 may then be manipulated by a user to enter data (e.g., user information, account information, password, etc.). For example, using a finger or stylus the user may touch a portion of the touchscreen 906 that corresponds to a desired symbol or key that the user wishes to enter/select. The touchscreen driver 918 then provides location information (e.g., coordinates) of where the touchscreen 906 sensed a touch (e.g., keypad press) to the TEE 912. The location information (e.g., coordinates) may thus bypass the HLOS 908 and be unknown to applications executed within the HLOS 908. A keypad mapping 919 function (e.g., lookup table) implemented within the TEE 912 converts the location information into a particular character, symbol, or other input. For example, the location information may include coordinates that map to a specific character or symbol. As another example, the location information may include a series of coordinates that represent a gesture, such as a swiping gesture. In at least one aspect of the disclosure, the keypad mapping 919 is unknown to the HLOS 908 because it strictly resides in the TEE 912. Thus, applications executed within the HLOS 908 may not have access to the keypad mapping 919.

Since the TEE 912 provides the keypad image 916 (e.g., the TEE 912 may be the source of the keypad image 916), the TEE 912 knows each character and/or symbol in the keypad image bounded by a set of location coordinates. Upon receipt of the location information from the touchscreen 906, the TEE 912 uses a keypad mapping 919 to ascertain the key, symbol, and/or gesture to which such location information corresponds to. Thus, instead of relying on a keypad image and/or keypad mapping provided by the HLOS 908, the device 900 utilizes a keypad image 916 and/or an touchscreen driver 918 at the TEE 912 to ensure that the touchscreen input device is self-contained within the TEE 912 and does not rely on the trustworthiness of the HLOS 908. Moreover, this process allows the TEE 912 to know which keys are being pressed without having to store and/or execute a user interface driver. Rather, a user interface driver may be executed by the HLOS 908. Storing and or executing a user interface driver at the TEE 912 may be undesirable in some applications since the TEE 912 may have limited resources, such as secure memory 914 which can be expensive to implement.

Figure 10:
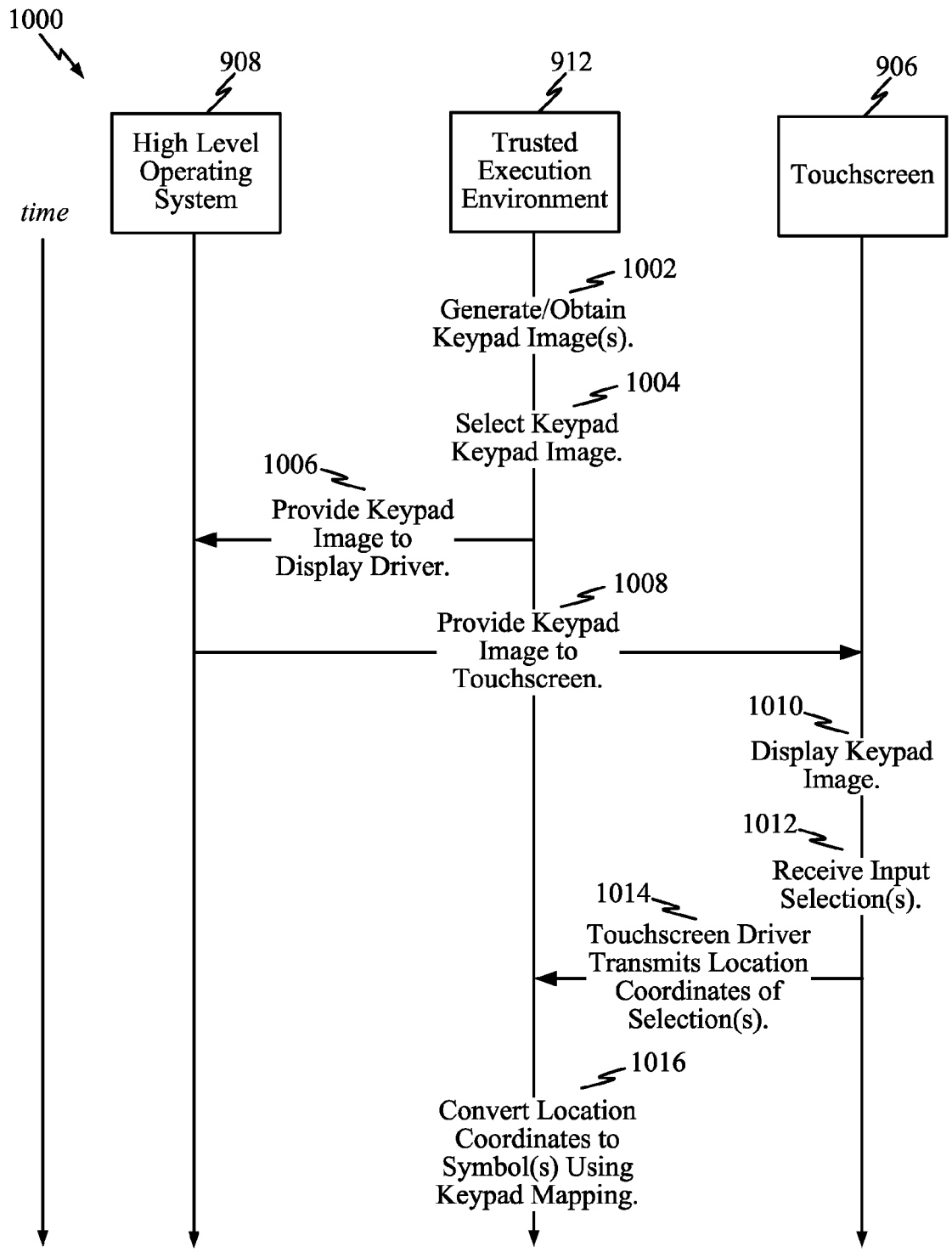
FIG. 10 illustrates a flow diagram of a secure input using a touchscreen keypad.

FIG. 10 illustrates a flow diagram 1000 of a secure input using a touchscreen keypad according to one aspect of the present disclosure. At step 1002, the TEE 912 generates and/or obtains (e.g., from secure memory 914) at least one keypad image. At step 1004, the TEE 912 optionally selects a keypad image if a plurality of keypad images were generated/obtained. At step 1006, the TEE 912 provides/transmits the selected keypad image to the display driver 910 operating within the HLOS 908. At step 1008, the display driver 910 of the HLOS 908 provides the keypad image to the touchscreen display 906. At step 1010, the touchscreen 906 displays the keypad image. At step 1012, the touchscreen 906 receives at least one keypad image input selection from a user. The selection made corresponds to one or more location coordinates associated with the touchscreen display 906. At step 1014, the touchscreen driver 918 transmits/provides the location coordinates associated with the selection(s) to the TEE 912. At step 1016, the TEE 912 converts the location coordinates associated with the selection(s) to the corresponding user desired symbol, key, and/or action using a keypad image mapping 919.

Figure 11A:
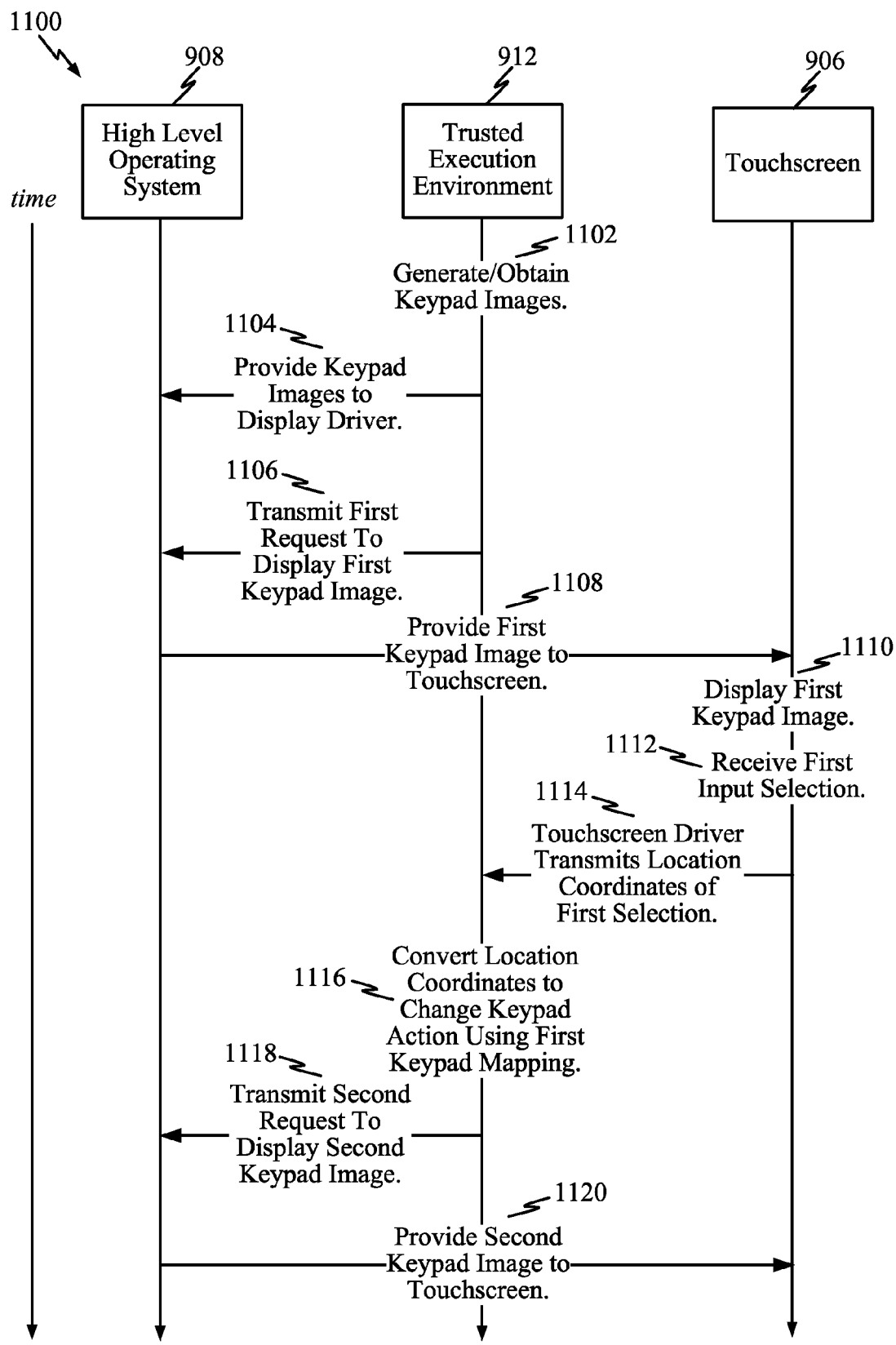
FIGS. 11A and 11B illustrate a flow diagram of a secure input using a touchscreen keypad operational within a processing circuit of a mobile device.
Figure 11B:
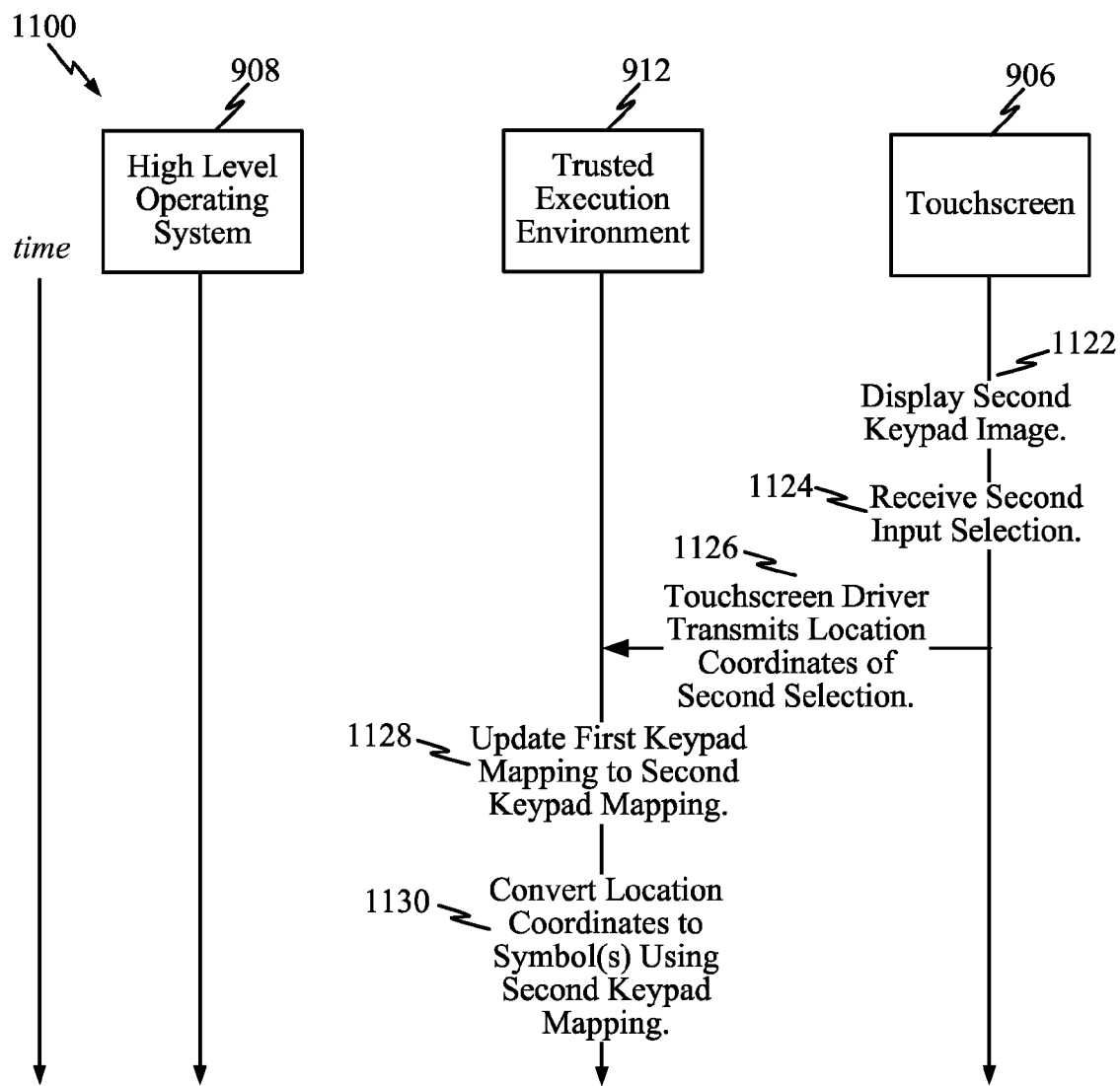

FIGS. 11A and 11B illustrate a flow diagram 1100 of a secure input using a touchscreen keypad operational within a processing circuit 902 of a mobile device 900 according to one aspect of the present disclosure. At step 1102, the TEE 912 generates and/or obtains (e.g., from secure memory 914) a plurality of keypad images. For example, the plurality of keypad images may include a numeric 0-9 personal identification number (PIN) keypad, a QWERTY style keyboard, a "shifted" version of the QWERTY style keypad, a standard telephone keypad, and/or additional keypads with other symbols. At step 1104, the TEE 912 provides/transmits the plurality of keypad images to the display driver 910 operating within the HLOS 908. According to one aspect, the plurality of keypad images are provided to an application requesting secure touchscreen keypad input running within the HLOS

908. At step 1106, the TEE 912 provides/transmits a first request to the display driver 910 of the HLOS 908 to display a first keypad image of the plurality of keypad images provided. The request specifies which of the plurality of keypad images the touchscreen 906 should display. According to one aspect, the first request may be sent periodically, or alternatively it may be sent on an as needed basis. At step 1108, the display driver 910 of the HLOS 908 provides the first keypad image to the touchscreen display 906. At step 1110, the touchscreen 906 displays the first keypad image. At step 1112, the touchscreen 906 receives a first keypad image input selection from a user. In this example, the first selection corresponds to a request by the user to change the keypad image to another keypad image of the plurality of keypad images. At step 1114, the touchscreen driver 918 transmits/provides the touchscreen location coordinates associated with the first selection to the TEE 912. At step 1116, the TEE 912 converts, using a first keypad image mapping, the location coordinates associated with the first selection to a request for changing the keypad image to another keypad image desired by the user.

At step 1118, the TEE 912 provides/transmits a second request to the display driver 910 of the HLOS 908 to display a desired, second keypad image of the plurality of keypad images. The second request specifies which of the plurality of keypad images the touchscreen 906 should display. According to one aspect, the second request may be sent periodically, or alternatively it may be sent on an as needed basis. At step 1120, the display driver 910 provides the second keypad image to the touchscreen display 906. Referring to FIG. 11B, at step 1122, the touchscreen 906 displays the second keypad image. At step 1124, the touchscreen 906 receives a second keypad image input selection from the user. In this example, the second selection corresponds to a symbol/character desired by the user. At step 1126, the touchscreen driver 918 transmits/provides the touchscreen location coordinates associated with the second selection to the TEE 912. At step 1128, the TEE 912 may update its keypad image mapping from the first keypad image mapping to a second keypad image mapping that corresponds to (e.g., associated with) the second keypad image provided to the touchscreen 906 at step 1108. According to one aspect, the update step 1128 may be performed after any one of steps 1116, 1118, 1120, 1122, and 1124. At step 1130, the TEE 912 converts, using the second keypad image mapping, the location coordinates associated with the second selection to the corresponding user desired symbol/character. Thus, the TEE 912 transmits to the HLOS 908 (e.g., an application requesting secure touchscreen keypad input running within the HLOS 908) all the keypad images at once, and then later sends requests to change the keypad images as needed or periodically.

Figure 12A:
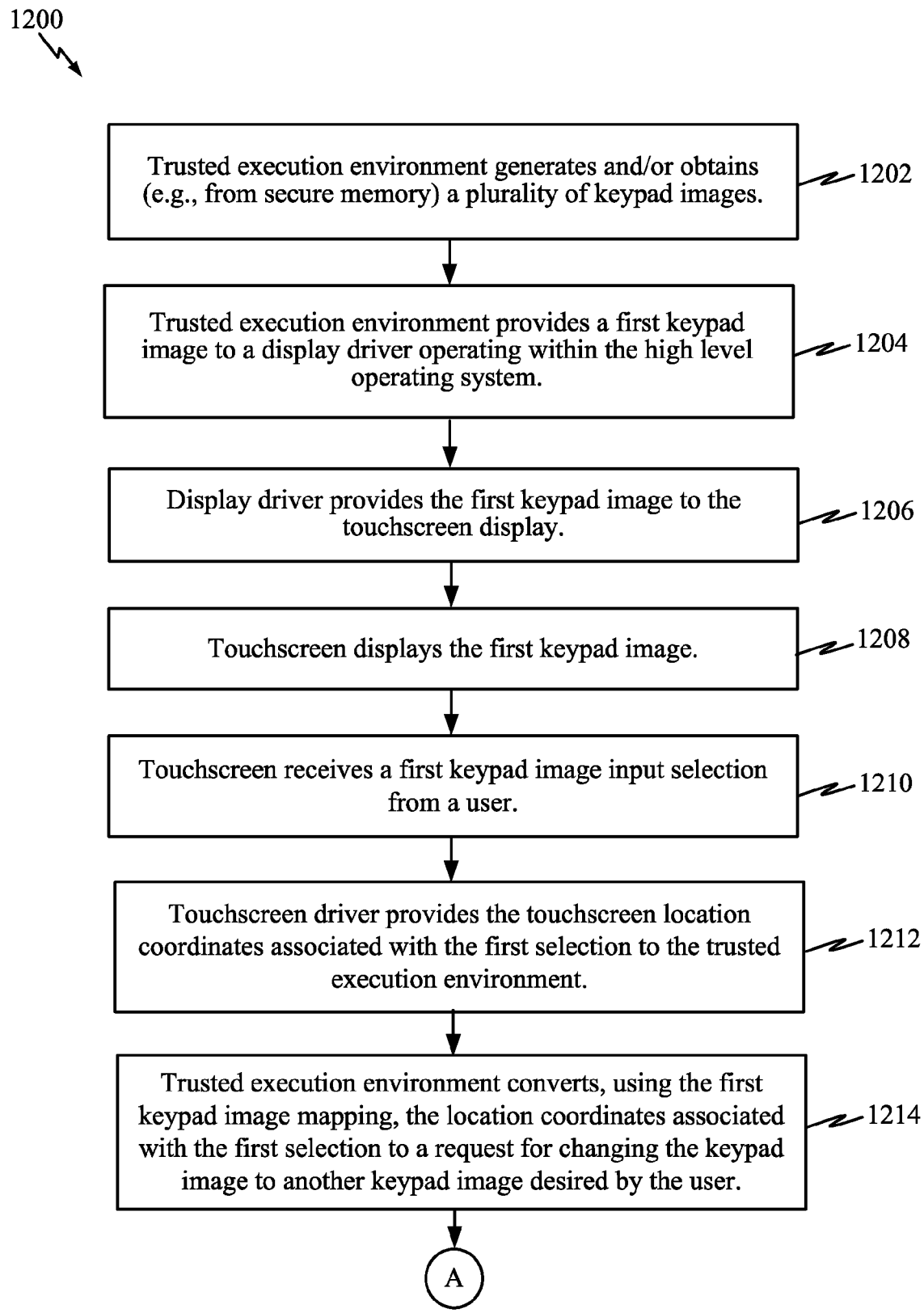
FIGS. 12A, 12B, and 13 illustrate flow diagrams of methods operational in a processing circuit of a mobile device for securely obtaining inputs from a touchscreen.
Figure 12B:
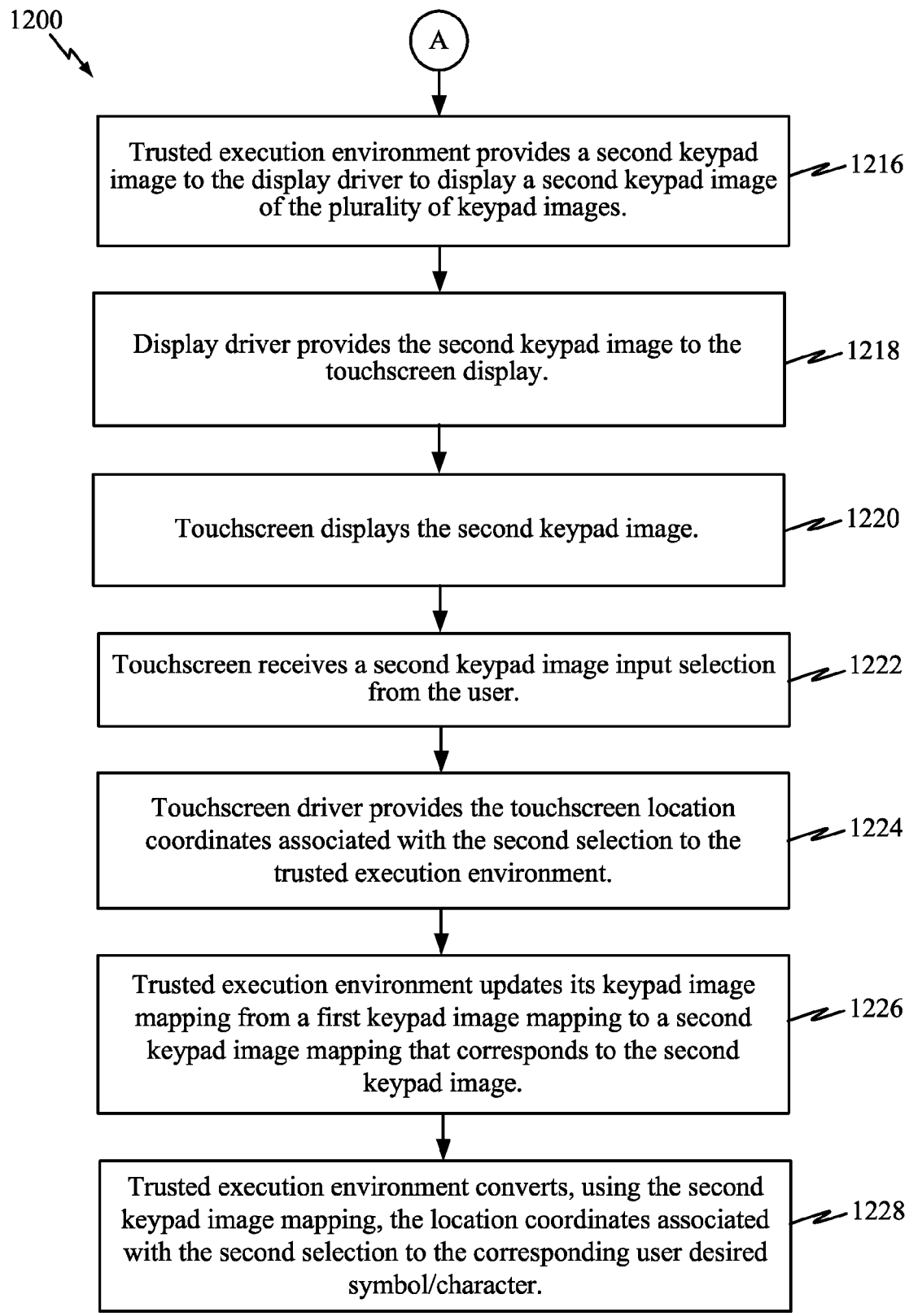

FIGS. 12A and 12B illustrate a flow diagram 1200 of a method operational in a processing circuit 902 of a mobile device 900 for securely obtaining inputs from a touchscreen 906 according to one aspect of the present disclosure. Referring to FIG. 12A, at step 1202, the TEE generates and/or obtains (e.g., from secure memory) a plurality of keypad images. For example, the plurality of keypad images may include a numeric 0-9 personal identification number (PIN) keypad, a QWERTY style keyboard, a "shifted" version of the QWERTY style keypad, a standard telephone keypad, and/or additional keypads with other symbols. At step 1204, the TEE provides a first keypad image to a display driver operating within the HLOS. According to one aspect, the first keypad image is provided to an application requesting secure touchscreen keypad input running within the HLOS. At step 1206, the display driver provides the first keypad image to the touchscreen display. At step 1208, the touchscreen displays the first keypad image. At step 1210, the touchscreen receives a first keypad image input selection from a user. In this example, the first selection corresponds to a request by the user to change the keypad image to another keypad image of the plurality of keypad images. At step 1212, the touchscreen driver provides the touchscreen location coordinates associated with the first selection to the TEE. At step 1214, the TEE converts, using driver first keypad image mapping, the location coordinates associated with the first selection to a request for changing the keypad image to another keypad image desired by the user.

Referring to FIG. 12B, at step 1216, the TEE provides a second keypad image to the display driver to display a second keypad image of the plurality of keypad images. At step 1218, the display driver provides the second keypad image to the touchscreen display. At step 1220, the touchscreen displays the second keypad image. At step 1222, the touchscreen receives a second keypad image input selection from the user. In this example, the second selection corresponds to a symbol/character desired by the user. At step 1224, the touchscreen driver provides the touchscreen location coordinates associated with the second selection to the TEE. At step 1226, the TEE may update a keypad image mapping from the first keypad image mapping to a second keypad image mapping that corresponds to (e.g., associated with) the second keypad image. In addition or in the alternative, the TEE may update any lookup tables that perform the location coordinate to symbol conversion. According to one aspect, the update step 1226 may be performed after any one of steps 1214, 1216, 1218, 1220, and 1222. At step 1228, the TEE converts, using the second keypad image mapping, the location coordinates associated with the second selection to the corresponding user desired symbol/character.

Figure 13:
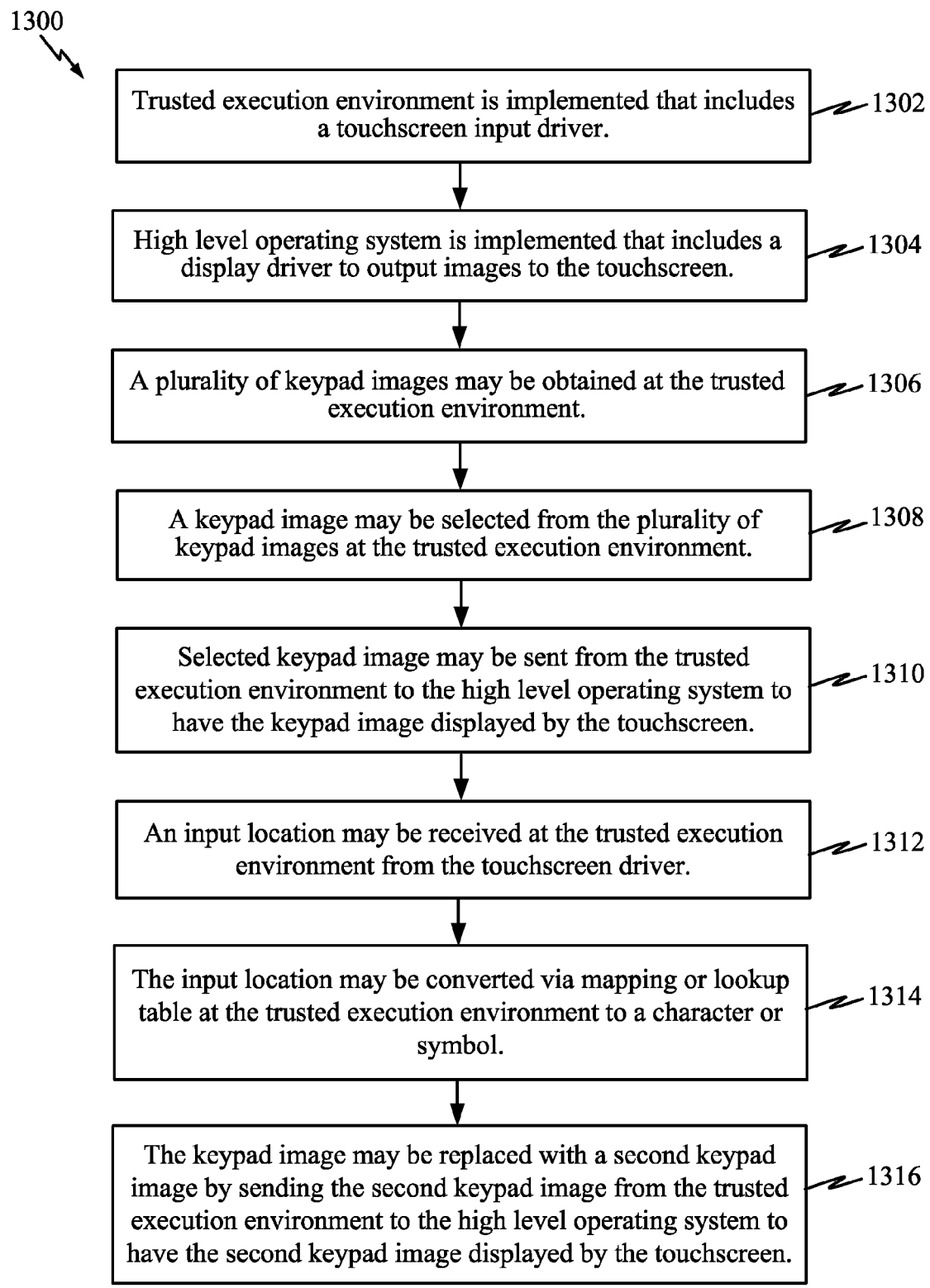

FIG. 13 illustrates a flow diagram 1300 of a method operational in a processing circuit 902 of a mobile device 900 for securely obtaining inputs from a touchscreen 906 according to one aspect of the present disclosure. At step 1302, a trusted execution environment (e.g., second execution environment) is implemented (e.g., on the processor 902) that includes a touchscreen input driver. At step 1304, a high level operating system (e.g., first execution environment) is implemented (e.g., on the processor 902) that includes a display driver to output images to the touchscreen. At step 1306, a plurality of keypad images may be obtained at the trusted execution environment 1308. At step 1308, a keypad image may be selected from the plurality of keypad images at the trusted execution environment. At step 1310, the selected keypad image may be sent from the trusted execution environment to the high level operating system to have the keypad image displayed by the touchscreen. Subsequently, at step 1312, an input location may be received at the trusted execution environment from the touchscreen driver. At step 1314, the input location may be converted (e.g., via mapping or lookup table) at the trusted execution environment to a character or symbol. At step 1316, the keypad image may be replaced with a second keypad image by sending the second keypad image from the trusted execution environment to the high level operating system to have the second keypad image displayed by the touchscreen.

Third Exemplary Implementation for Secure Input Via Touch Screen

Figure 14:
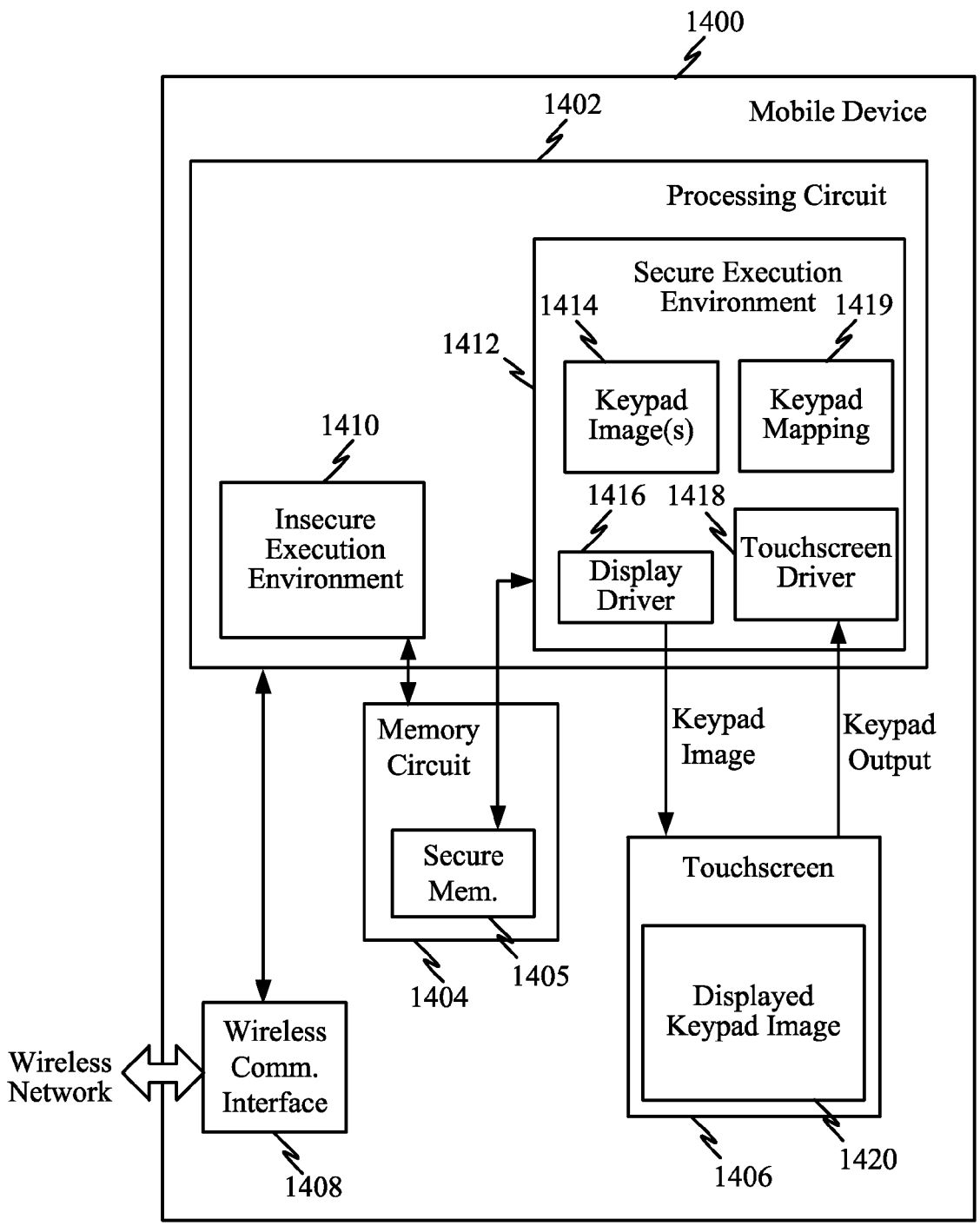
FIG. 14 illustrates a block diagram of a device which may implement a secure input of a touchscreen keypad.

FIG. 14 illustrates a block diagram of a device 1400 which may implement a secure input of a touchscreen keypad according to one aspect of the present disclosure. The device 1400 may be, but is not limited to, a mobile device, a mobile phone, a smartphone, a laptop computer, a tablet, and/or any other wireless communication device. The device 1400 may include a processing circuit 1402, a memory circuit 1404, a touchscreen 1406, and/or a wireless communication interface 1408. The processing circuit 1402, the memory circuit 1404, the touchscreen 1406, and the wireless communication interface 1408 may be communicatively and/or electrically coupled together. The processing circuit 1402 may be implemented as one or more processing devices (e.g., processors) and may be adapted to operate an insecure execution environment 1410 and a secure execution environment 1412. The insecure execution environment 1410 and the secure execution environment 1412 may run in parallel to each other on a single processor. As another example, the insecure and secure execution environments 1410, 1412 may run in parallel on different processors or processor cores that make up the processing circuit 1402. The memory circuit 1404 may be implemented as one or more memory devices (e.g., RAM, ROM, volatile memory, non-volatile memory, hard disk drive, etc.). The memory circuit 1404 may include a secure memory portion 1405 that cannot be easily accessed or modified by applications not associated with the secure execution environment 1412. The touchscreen 1406 may be an electronic visual display that is adapted to receive inputs and also display visual outputs. The touchscreen 1406 may act as an input device by detecting the presence and location of a human and/or stylus touch within its display area. The touchscreen 1406 may be, but is not limited to, a resistive touchscreen, surface acoustic touchscreen, capacitive (e.g., surface, projected, mutual, or self) touchscreen, infrared touchscreen, optical imaging touchscreen, dispersive signal touchscreen, and/or acoustic pulse recognition touchscreen. The wireless communication interface 1408 may serve to communicatively couple the device 1400 to a wireless network through which it can send and/or receive data.

The insecure execution environment 1410 (also referred to herein as a "first execution environment") may be, for example, a high level operating system that runs one or more applications. The insecure execution environment 1410 may be considered "insecure" in that information at the insecure execution environment 1410 may be accessed by unintended parties or applications. For example, a malicious entity may install an application that can snoop on a memory stack, memory space, buffers, registers, and/or data path interface associated with the insecure execution environment 1410 in order to obtain unauthorized access to data and/or information (e.g., passwords, user account information, etc.).

By contrast, the secure execution environment 1412 (also referred to herein as a "second execution environment") may be, for example, a trusted execution environment that is not easily accessible by applications operating at the insecure execution environment 1410. Thus, the secure execution environment 1412 is protected from snooping or unauthorized access that can reveal data or information associated with the secure execution environment 1412. The insecure execution environment 1410 may interact with the secure execution environment 1412 using a prescribed set of interfaces. The functionality of the secure execution environment 1412 is typically limited to that provided by the secure execution environment 1412 vendor/distributor, and thus it is very difficult to install arbitrary applications in the secure execution environment 1412 since it is tightly controlled. One non-limiting example of a secure execution environment is Mobicore® created by Gieseke & Devrient GmbH.

In the example illustrated in FIG. 14, the secure execution environment 1412 may execute a touchscreen driver 1418 (e.g., touchscreen input driver) to process outputs generated by the touchscreen 1406, and may also execute a display driver 1416 to control the images displayed by the touchscreen 1406. For example, the touchscreen driver receives the electronic signals generated by the touchscreen 1406 in response to screen touches by a user and generates screen location coordinates that correspond to the locations on the touchscreen 1406 where the user touched. In the illustrated example, the touchscreen driver 1418 and the display driver 1416 may be strictly contained and/or executed within the secure execution environment 1412 (e.g., stored within secure memory 1405). To provide a secure implementation of a touchscreen input device, the secure execution environment 1412 may provide at least one keypad image 1414 to the display driver 1416. The display driver 1416 causes the keypad image 1414 to be displayed at the touchscreen 1406. According to one aspect of the present disclosure, the secure execution environment 1412 generates the keypad image 1414. In another aspect, the keypad image 1414 is stored within the secure memory portion 1405 of the memory circuit 1404 and retrieved from the secure memory 1405 by the secure execution environment 1412.

The keypad image 1414 transmitted to the touchscreen 1406 is then displayed by the touchscreen 1406. The displayed keypad image 1420 may then be manipulated by a user (e.g., pressing keys or performing other gestures) to enter data (e.g., user information, account information, password, etc.). For example, using a finger or stylus the user may touch a portion of the touchscreen 1406 that corresponds to a desired symbol or key that the user wishes to enter/select. The touchscreen driver 1418 then provides location information (e.g., coordinates) of where the touchscreen 1406 sensed a touch (e.g., keypad press) to the secure execution environment 1412. The location information (e.g., coordinates) may thus bypass the insecure execution environment 1410 and be unknown to applications executed within the insecure execution environment 1410. The secure execution environment 1412 includes a keypad mapping 1419 function (e.g., lookup table) that converts the location information into a particular character, symbol, or other input. For example, the location information may include coordinates that map to a specific character or symbol. As another example, the location information may include a series of coordinates that represent a gesture, such as a swiping gesture. In at least one aspect of the disclosure, the keypad mapping 1419 is unknown to the insecure execution environment 1410 because it strictly resides in the secure execution environment 1412. Thus, applications executed within the insecure execution environment 1410 may not have access to the keypad mapping 1419.

Since the secure execution environment 1412 provides the keypad image 916 (e.g., the TEE 1412 may be the source of the keypad image 1414), the secure execution environment 1412 knows each character and/or symbol in the keypad image bounded by a set of location coordinates. Upon receipt of the location information from the touchscreen driver 1418, the secure execution environment 1412 uses a keypad mapping 1419 (e.g., function and/or lookup tables) to ascertain the key, symbol, and/or gesture to which such location information corresponds. Thus, instead of relying on a keypad image and/or keypad mapping provided by the insecure execution environment 1410, the device 1400 utilizes a keypad image 1414, a display driver 1416, and/or an input driver 1418 at the secure execution environment 1412 to ensure that the touchscreen input device is self-contained and does not rely on the trustworthiness of the insecure execution environment 1410. Moreover, this process allows the secure execution environment 1412 to know which keys are being pressed without having to store and/or execute a user interface driver. Rather, a user interface driver may be executed by the insecure execution environment 1410. Storing and or executing a user interface driver at the secure execution environment 1412 may be undesirable in some applications since the secure execution environment 1412 may have limited resources, such as secure memory 1405 which can be expensive to implement.

Figure 15:
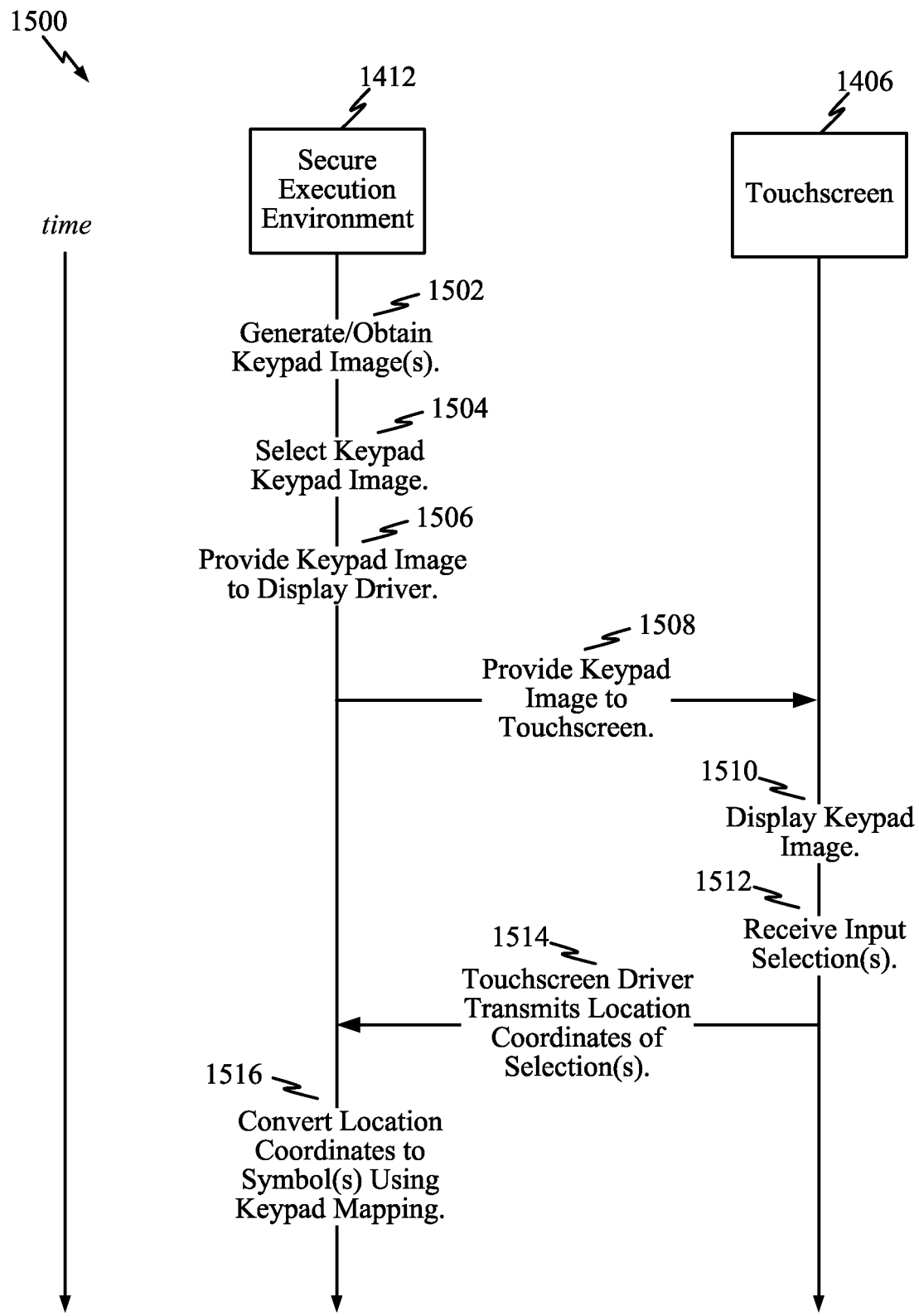
FIGS. 15, 16A, and 16B illustrate flow diagrams of a secure input using a touchscreen keypad.

FIG. 15 illustrates a flow diagram 1500 of a secure input using a touchscreen keypad according to one aspect of the present disclosure. At step 1502, the secure execution environment 1412 generates and/or obtains (e.g., from secure memory 1405) at least one keypad image. At step 1504, the secure execution environment 1412 optionally selects a keypad image if a plurality of keypad images were generated/obtained. At step 1506, the secure execution environment 1412 provides/transmits the selected keypad image to the display driver 1416 operating within the secure execution environment 1412. At step 1508, the display driver 1416 provides the keypad image to the touchscreen display 1406. At step 1510, the touchscreen 1406 displays the keypad image. At step 1512, the touchscreen 1406 receives at least one keypad image input selection from a user. The selection made corresponds to one or more location coordinates associated with the touchscreen display 1406. At step 1514, the touchscreen driver 1418 transmits/provides the location coordinates associated with the selection(s) to the secure execution environment 1412. At step 1516, the secure execution environment 1412 converts the location coordinates associated with the selection(s) to the corresponding user desired symbol, key, and/or action using the keypad mapping 1419.

Figure 16A:
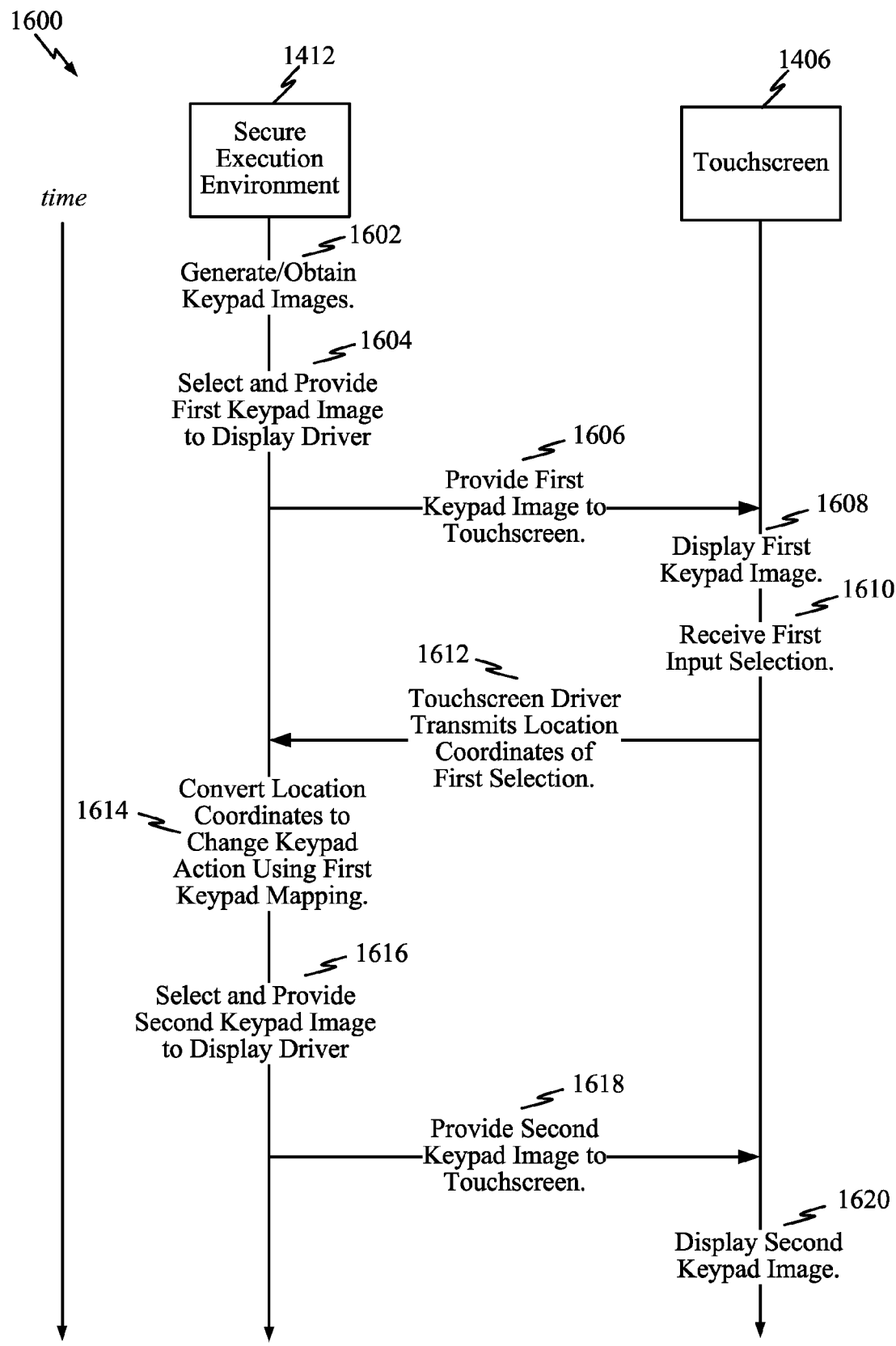
Figure 16B:
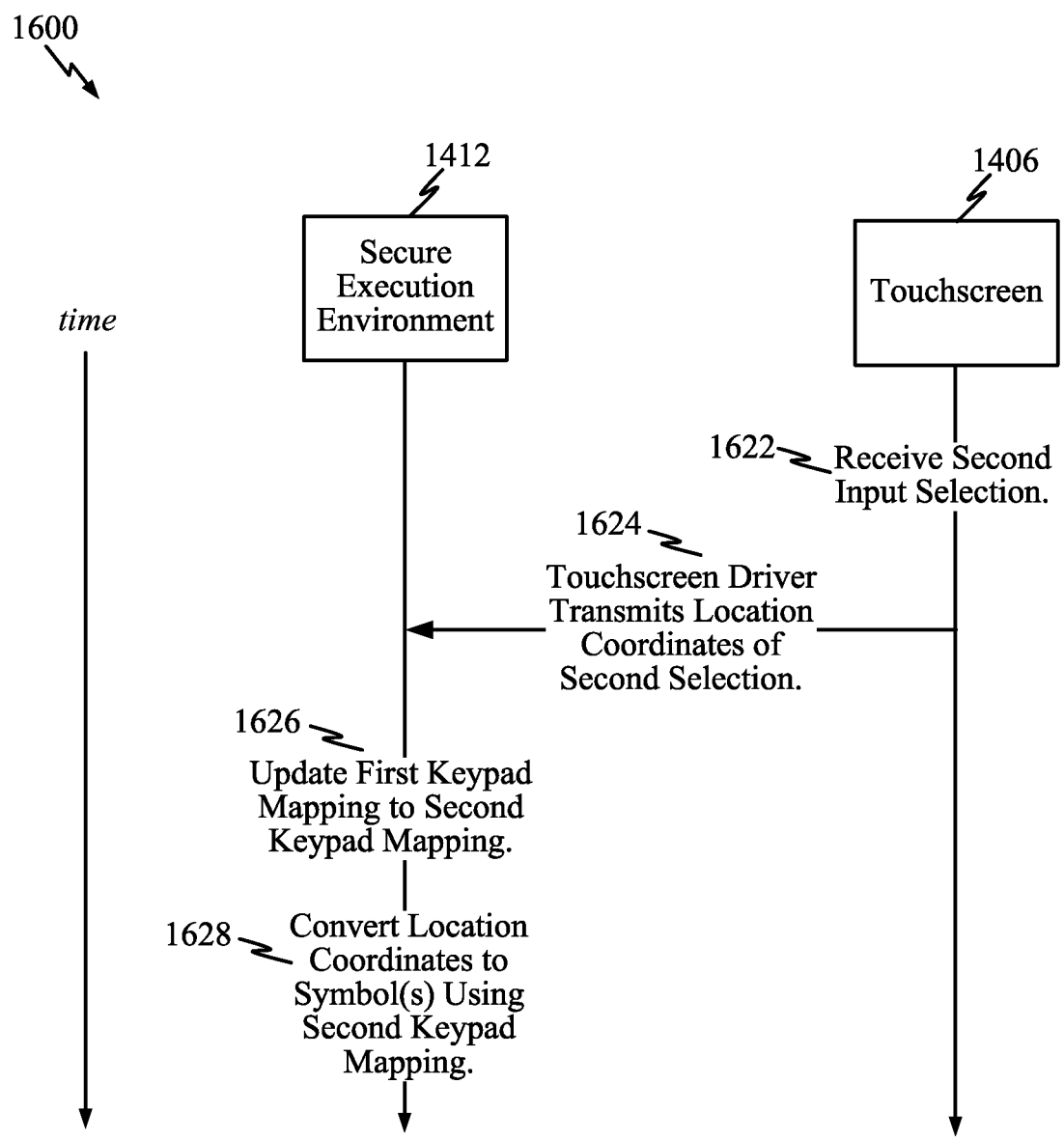

FIGS. 16A and 16B illustrate a flow diagram 1600 of a secure input using a touchscreen keypad according to one aspect of the present disclosure. At step 1602, the secure execution environment 1412 generates and/or obtains (e.g., from secure memory 1405) a plurality of keypad images. For example, the plurality of keypad images may include a numeric 0-9 personal identification number (PIN) keypad, a QWERTY style keyboard, a "shifted" version of the QWERTY style keypad, a standard telephone keypad, and/or additional keypads with other symbols. At step 1604, the secure execution environment 1412 selects a first keypad image from the plurality of keypad images, and provides/transmits the first keypad image to the display driver 1416 operating within the secure execution environment 1412. According to one aspect, the first keypad image is provided to an application requesting secure touchscreen keypad input running within the secure execution environment 1412. At step 1606, the display driver 1416 of the secure execution environment 1412 provides the first keypad image to the touchscreen display 1406. At step 1608, the touchscreen 1406 displays the first keypad image. At step 1610, the touchscreen 1406 receives a first keypad image input selection from a user. In this example, the first selection corresponds to a request by the user to change the keypad image to another keypad image of the plurality of keypad images. At step 1612, the touchscreen driver 1418 transmits/provides the touchscreen location coordinates associated with the first selection to the input driver 1418 of the secure execution environment 1412. At step 1614, the secure execution environment 1412 converts, using a first keypad image mapping, the location coordinates associated with the first selection to a request for changing the keypad image to another keypad image desired by the user.

At step 1616, the secure execution environment 1412 selects a second keypad image from the plurality of keypad images, and provides/transmits the second keypad image to the display driver 1416 to display the second keypad image. At step 1618, the display driver 1416 provides the second keypad image to the touchscreen display 1406. At step 1620, the touchscreen 1406 displays the second keypad image. Referring to FIG. 16B, at step 1622, the touchscreen 1406 receives a second keypad image input selection from the user. In this example, the second selection corresponds to a symbol/character desired by the user. At step 1624, the touchscreen driver 1418 transmits/provides the touchscreen location coordinates associated with the second selection to the secure execution environment 1412. At step 1626, the input driver of the secure execution environment 1412 may update a keypad image mapping from a first keypad image mapping to a second keypad image mapping that corresponds to (e.g., associated with) the second keypad image. In addition or in the alternative, the secure execution environment 1412 may update any lookup tables that perform the location coordinate to symbol conversion. According to one aspect, the update step 1626 may be performed after any one of steps 1614, 1616, 1618, 1620, and 1622. At step 1628, the secure execution environment 1412 converts, using the second keypad image mapping, the location coordinates associated with the second selection to the corresponding user desired symbol/character.

Figure 17A:
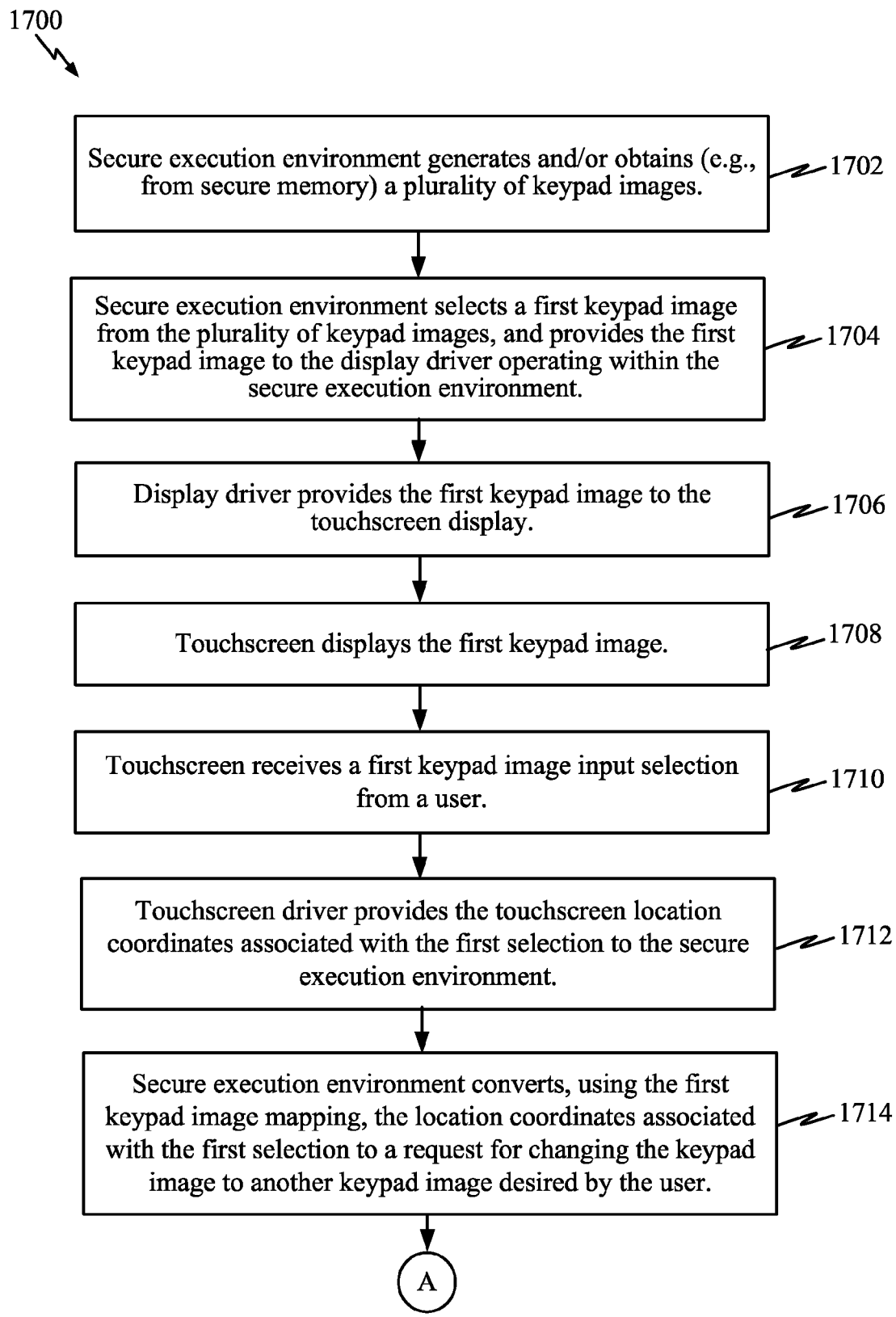
FIGS. 17A and 17B illustrate a flow diagram of a method operational in a processing circuit of a device for securely obtaining inputs from a touchscreen.
Figure 17B:
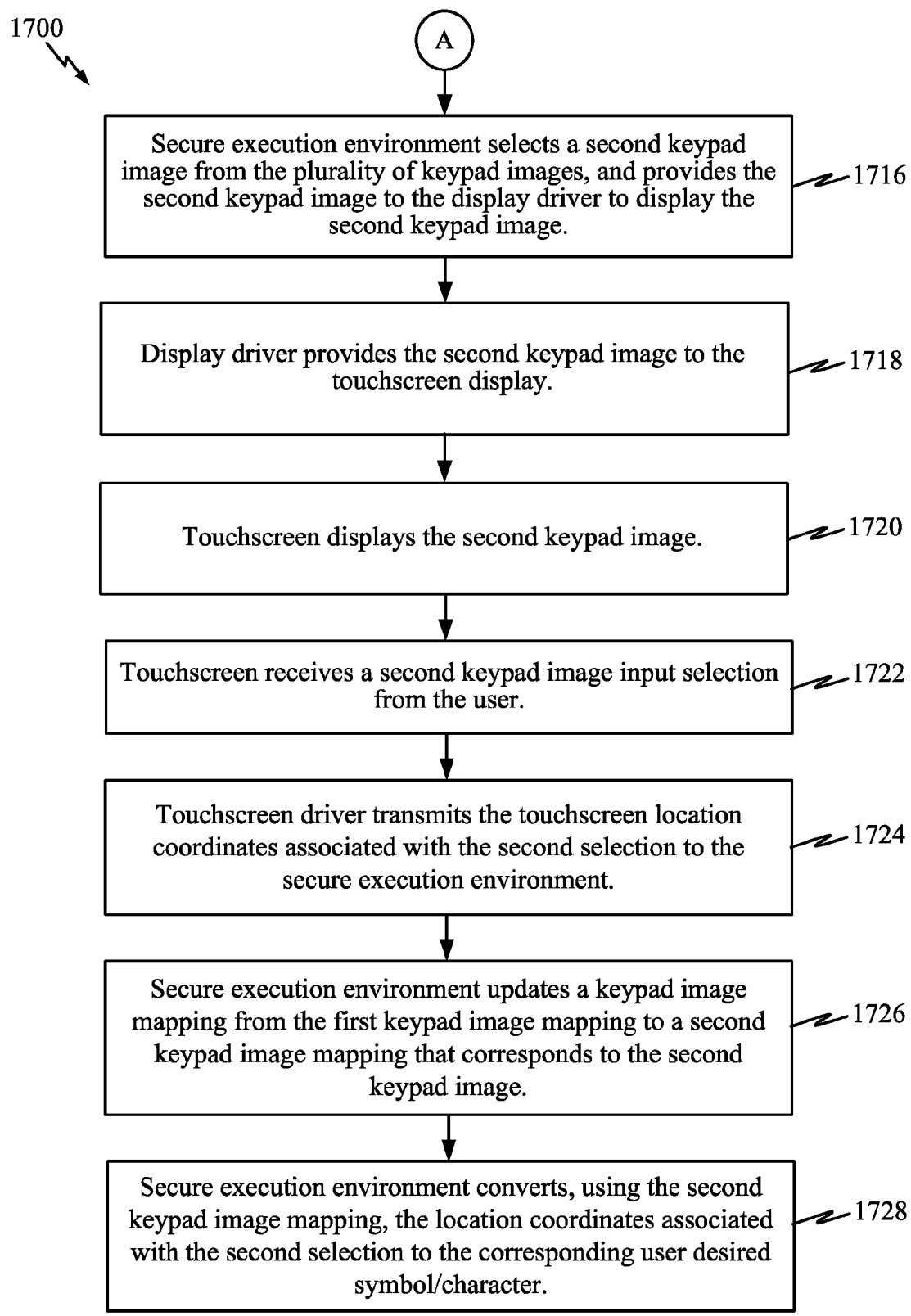

FIGS. 17A and 17B illustrate a flow diagram 1700 of a method operational in a processing circuit 1402 of a device 1400 for securely obtaining inputs from a touchscreen 1406 according to one aspect of the present disclosure. At step 1702, the secure execution environment generates and/or obtains (e.g., from secure memory) a plurality of keypad images. At step 1704, the secure execution environment selects a first keypad image from the plurality of keypad images, and provides the first keypad image to the display driver operating within the secure execution environment. According to one aspect, the first keypad image is provided to an application requesting secure touchscreen keypad input running within the secure execution environment. At step 1706, the display driver of the secure execution environment provides the first keypad image to the touchscreen display. At step 1708, the touchscreen displays the first keypad image. At step 1710, the touchscreen receives a first keypad image input selection from a user. In this example, the first selection corresponds to a request by the user to change the keypad image to another keypad image of the plurality of keypad images. At step 1712, the touchscreen driver provides the touchscreen location coordinates associated with the first selection to the secure execution environment. At step 1714, the secure execution environment converts, using a first keypad image mapping, the location coordinates associated with the first selection to a request for changing the keypad image to another keypad image desired by the user.

Referring to FIG. 17B, at step 1716, the secure execution environment selects a second keypad image from the plurality of keypad images, and provides the second keypad image to the display driver to display the second keypad image. At step 1718, the display driver provides the second keypad image to the touchscreen display. At step 1720, the touchscreen displays the second keypad image. At step 1722, the touchscreen receives a second keypad image input selection from the user. In this example, the second selection corresponds to a symbol/character desired by the user. At step 1724, the touchscreen driver transmits the touchscreen location coordinates associated with the second selection to the secure execution environment. At step 1726, the secure execution environment may update a keypad image mapping from the first keypad image mapping to a second keypad image mapping that corresponds to (e.g., associated with) the second keypad image. In addition or in the alternative, the secure execution environment may update any lookup tables that perform the location coordinate to symbol conversion. According to one aspect, the update step 1726 may be performed after any one of steps 1714, 1716, 1718, 1720, and 1722. At step 1728, the secure execution environment converts, using the second keypad image mapping, the location coordinates associated with the second selection to the corresponding user desired symbol/character.

Figure 18:
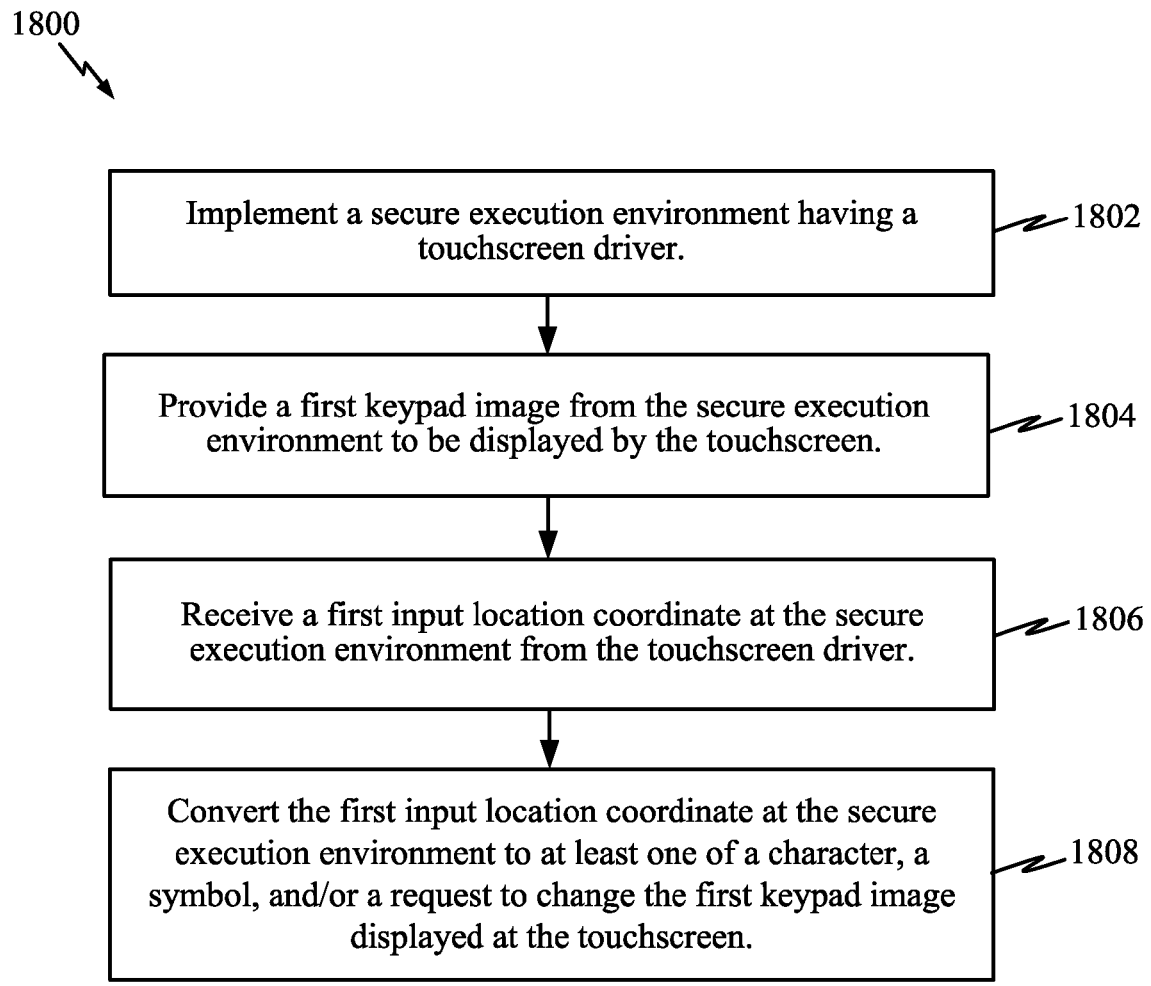
FIG. 18 illustrates a flow chart of a method operational in a device for secure input using a touchscreen.

FIG. 18 illustrates a flow chart 1800 of a method operational in a device for secure input using a touchscreen according to one aspect of the present disclosure. At step 1802, the device implements a secure execution environment having a touchscreen driver. At step 1804, the device provides a first keypad image from the secure execution environment to be displayed by the touchscreen. At step 1806, the device receives a first input location coordinate at the secure execution environment from the touchscreen driver. At step 1808, the device converts the first input location coordinate at the secure execution environment to at least one of a character, a symbol, and/or a request to change the first keypad image displayed at the touchscreen.

One or more of the components, steps, features, and/or functions illustrated in FIGS. 1, 2, 3A, 3B, 4A, 4B, 5, 6A, 6B, 7A, 7B, 8, 9, 10, 11A, 11B, 12A, 12B, 13, 14, 15, 16A, 16B, 17A, 17B, and/or 18 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 1, 9, and/or 14 may be configured to perform one or more of the methods, features, or steps described in FIGS. 2, 3A, 3B, 4A, 4B, 5, 6A, 6B, 7A, 7B, 8, 10, 11A, 11B, 12A, 12B, 13, 15, 16A, 16B, 17A, 17B, and/or 18. The algorithms described herein may also be efficiently implemented in software and/or embedded in hardware.

Moreover, in one aspect of the disclosure, the processing circuit 102 illustrated in FIG. 1 may be a specialized processor (e.g., an application specific integrated circuit (ASIC)) that is specifically designed and/or hard-wired to perform the algorithms, methods, and/or steps described in FIGS. 2, 3A, 3B, 4A, 4B, 5, 6A, 6B, 7A, 7B, 8, and 18. Thus, such a specialized processor (ASIC) may be one example of a means for executing the algorithms, methods, and/or steps described in FIGS. 2, 3A, 3B, 4A, 4B, 5, 6A, 6B, 7A, 7B, 8, and 18. The memory circuit 104, 105 may also store processor 102 readable instructions that when executed by a specialized processor (e.g., ASIC) of processor 102 causes the specialized processor to perform the algorithms, methods, and/or steps described in FIGS. 2, 3A, 3B, 4A, 4B, 5, 6A, 6B, 7A, 7B, 8, and 18. In another aspect of the disclosure, the processing circuit 902 illustrated in FIG. 9 may be a specialized processor (e.g., ASIC) that is specifically designed and/or hard-wired to perform the algorithms, methods, and/or steps described in FIGS. 10, 11A, 11B, 12A, 12B, 13, and 18. Thus, such a specialized processor (ASIC) may be one example of a means for executing the algorithms, methods, and/or steps described in FIGS. 10, 11A, 11B, 12A, 12B, 13, and 18. The memory circuit 904, 914 may also store processor 902 readable instructions that when executed by a specialized processor (e.g., ASIC) of processor 902 causes the specialized processor to perform the algorithms, methods, and/or steps described in FIGS. 10, 11A, 11B, 12A, 12B, 13, and 18. In yet another aspect of the disclosure, the processing circuit 1402 illustrated in FIG. 14 may be a specialized processor (e.g., an application specific integrated circuit (ASIC)) that is specifically designed and/or hard-wired to perform the algorithms, methods, and/or steps described in FIGS. 15, 16A, 16B, 17A, 17B, and 18. Thus, such a specialized processor (ASIC) may be one example of a means for executing the algorithms, methods, and/or steps described in FIGS. 15, 16A, 16B, 17A, 17B, and 18. The memory circuit 1404, 1405 may also store processor 1402 readable instructions that when executed by a specialized processor (e.g., ASIC) of processor 1402 causes the specialized processor to perform the algorithms, methods, and/or steps described in FIGS. 15, 16A, 16B, 17A, 17B, and 18.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A device comprising:
a touchscreen adapted to display an image and receive an input; and
a processing circuit communicatively coupled to the touchscreen, the processing circuit adapted to
implement an insecure execution environment that includes an operating system of the device,
implement a secure execution environment configured to communicate with the insecure execution environment, the secure execution environment including a touchscreen driver dedicated to the secure execution environment,
provide a first keypad image from the secure execution environment to be displayed by the touchscreen,
receive a first input location coordinate at the secure execution environment from the touchscreen driver, and
convert the first input location coordinate at the secure execution environment to at least one of a character, a symbol, and/or a request to change the first keypad image displayed at the touchscreen.

2. The device of claim 1, wherein the processing circuit is further adapted to:
convert the first input location coordinate at the secure execution environment to at least one of the character, the symbol, and/or the request to change the first keypad image displayed at the touchscreen using a first keypad image mapping implemented within the secure execution environment.

3. The device of claim 1, wherein the processing circuit is further adapted to:
generate the first keypad image at the secure execution environment prior to providing the first keypad image.

4. The device of claim 1, wherein the processing circuit is further adapted to:
obtain the first keypad image from a secure memory associated with the secure execution environment prior to providing the first keypad image.

5. The device of claim 1, wherein the secure execution environment includes a display driver that sends the first keypad image to the touchscreen.

6. The device of claim 1, wherein
data stored or processed at the secure execution environment is secure from unauthorized access by an application associated with the insecure execution environment.

7. The device of claim 6, wherein the secure execution environment is independent of the insecure execution environment.

8. The device of claim 6, wherein the insecure execution environment is insecure relative to the secure execution environment.

9. The device of claim 6, wherein the first input location coordinate from the touchscreen bypasses the insecure execution environment.

10. The device of claim 6, wherein converting the first input location coordinate at the secure execution environment includes converting the first input location coordinate at the secure execution environment to the request to change the first keypad image displayed at the touchscreen, and wherein the processing circuit is further adapted to:
obtain a plurality of keypad images, the plurality of keypad images including the first keypad image and a second keypad image;
provide the plurality of keypad images from the secure execution environment to a display driver associated with the insecure execution environment; and
transmit a first request to display the first keypad image to the display driver prior to receiving the first input location coordinate.

11. The device of claim 10, wherein the processing circuit is further adapted to:
transmit a second request to display the second keypad image to the display driver after converting the first input location coordinate at the secure execution environment to the request to change the first keypad image displayed at the touchscreen;
update a first keypad image mapping corresponding to the first keypad image to a second keypad image mapping corresponding to the second keypad image;
receive a second input location coordinate at the secure execution environment from the touchscreen driver; and
convert, using the second keypad image mapping, the second input location coordinate at the secure execution environment to a character or a symbol.

12. The device of claim 6, wherein providing the first keypad image includes providing the first keypad image to a display driver associated with the insecure execution environment.

13. The device of claim of claim 12, wherein the processing circuit is further adapted to:
obtain a plurality of keypad images, the plurality of keypad images including the first keypad image; and select the first keypad image of the plurality keypad images prior to providing the first keypad image to the display driver associated with the insecure execution environment.

14. The device of claim 13, wherein converting the first input location coordinate at the secure execution environment includes converting the first input location coordinate at the secure execution environment to the request to change the first keypad image displayed at the touchscreen, and wherein the processing circuit is further adapted to:
provide a second keypad image of the plurality of keypad images from the secure execution environment to the display driver associated with the insecure execution environment;
update a first keypad image mapping corresponding to the first keypad image to a second keypad image mapping corresponding to the second keypad image;
receive a second input location coordinate at the secure execution environment from the touchscreen driver; and
convert, using the second keypad image mapping, the second input location coordinate at the secure execution environment to a character or a symbol.

15. A method operational in a device for secure input using a touchscreen, the method comprising:
implementing an insecure execution environment that includes an operating system of the device;
implementing a secure execution environment configured to communicate with the insecure execution environment, the secure execution environment including a touchscreen driver dedicated to the secure execution environment;
providing a first keypad image from the secure execution environment to be displayed by the touchscreen;
receiving a first input location coordinate at the secure execution environment from the touchscreen driver; and
converting the first input location coordinate at the secure execution environment to at least one of a character, a symbol, and/or a request to change the first keypad image displayed at the touchscreen.

16. The method of claim 15, further comprising:
converting the first input location coordinate at the secure execution environment to at least one of the character, the symbol, and/or the request to change the first keypad image displayed at the touchscreen using a first keypad image mapping implemented within the secure execution environment.

17. The method of claim 15, further comprising:
generating the first keypad image at the secure execution environment prior to providing the first keypad image.

18. The method of claim 15, further comprising:
obtaining the first keypad image from a secure memory associated with the secure execution environment prior to providing the first keypad image.

19. The method of claim 15, wherein the secure execution environment includes a display driver that sends the first keypad image to the touchscreen.

20. The method of claim 15,
wherein data stored or processed at the secure execution environment is secure from unauthorized access by an application associated with the insecure execution environment.

21. The method of claim 20, wherein the secure execution environment is independent of the insecure execution environment.

22. The method of claim 20, wherein the insecure execution environment is insecure relative to the secure execution environment.

23. The method of claim 20, wherein the first input location coordinate from the touchscreen bypasses the insecure execution environment.

24. The method of claim 20, wherein converting the first input location coordinate at the secure execution environment includes converting the first input location coordinate at the secure execution environment to the request to change the first keypad image displayed at the touchscreen, and the method further comprises:
obtaining a plurality of keypad images, the plurality of keypad images including the first keypad image and a second keypad image;
providing the plurality of keypad images from the secure execution environment to a display driver associated with the insecure execution environment; and
transmitting a first request to display the first keypad image to the display driver prior to receiving the first input location coordinate.

25. The method of claim 24, further comprising:
transmitting a second request to display the second keypad image to the display driver after converting the first input location coordinate at the secure execution environment to the request to change the first keypad image displayed at the touchscreen;
updating a first keypad image mapping corresponding to the first keypad image to a second keypad image mapping corresponding to the second keypad image;
receiving a second input location coordinate at the secure execution environment from the touchscreen driver; and
converting, using the second keypad image mapping, the second input location coordinate at the secure execution environment to a character or a symbol.

26. The method of claim 20, wherein providing the first keypad image includes providing the first keypad image to a display driver associated with the insecure execution environment.

27. The method of claim 26, further comprising:
obtaining a plurality of keypad images, the plurality of keypad images including the first keypad image; and
selecting the first keypad image of the plurality keypad images prior to providing the first keypad image to the display driver associated with the insecure execution environment.

28. The method of claim 27, wherein converting the first input location coordinate at the secure execution environment includes converting the first input location coordinate at the secure execution environment to the request to change the first keypad image displayed at the touchscreen, and the method further comprises:
providing a second keypad image of the plurality of keypad images from the secure execution environment to the display driver associated with the insecure execution environment;
updating a first keypad image mapping corresponding to the first keypad image to a second keypad image mapping corresponding to the second keypad image;
receiving a second input location coordinate at the secure execution environment from the touchscreen driver; and
converting, using the second keypad image mapping, the second input location coordinate at the secure execution environment to a character or a symbol.

29. A device comprising:
means for implementing an insecure execution environment that includes an operating system of the device;
means for implementing a secure execution environment configured to communicate with the insecure execution environment, the secure execution environment including a touchscreen driver dedicated to the secure execution environment;

means for providing a first keypad image from the secure execution environment to be displayed by a touchscreen;

means for receiving a first input location coordinate at the secure execution environment from the touchscreen driver; and means for converting the first input location coordinate at the secure execution environment to at least one of a character, a symbol, and/or a request to change the first keypad image displayed at the touchscreen.

30. The device of claim 29, further comprising:
means for converting the first input location coordinate at the secure execution environment to at least one of the character, the symbol, and/or the request to change the first keypad image displayed at the touchscreen using a first keypad image mapping associated with the secure execution environment.

31. The device of claim 29, further comprising:
means for generating the first keypad image at the secure execution environment prior to providing the first keypad image.

32. The device of claim 29, further comprising:
means for obtaining the first keypad image from a secure memory associated with the secure execution environment prior to providing the first keypad image.

33. The device of claim 29, wherein the secure execution environment includes a display driver that sends the first keypad image to the touchscreen.

34. The device of claim 29,
wherein data stored or processed at the secure execution environment is secure from unauthorized access by an application associated with the insecure execution environment.

35. The device of claim 34, wherein the secure execution environment is independent of the insecure execution environment.

36. The device of claim 34, wherein the insecure execution environment is insecure relative to the secure execution environment.

37. The device of claim 34, wherein the first input location coordinate from the touchscreen bypasses the insecure execution environment.

38. The device of claim 34, wherein means for converting the first input location coordinate at the secure execution environment includes means for converting the first input location coordinate at the secure execution environment to the request to change the first keypad image displayed at the touchscreen, and the device further comprises:
means for obtaining a plurality of keypad images, the plurality of keypad images including the first keypad image and a second keypad image;
means for providing the plurality of keypad images from the secure execution environment to a display driver associated with the insecure execution environment; and
means for transmitting a first request to display the first keypad image to the display driver prior to receiving the first input location coordinate.

39. The device of claim 38, further comprising:
means for transmitting a second request to display the second keypad image to the display driver after converting the first input location coordinate at the secure execution environment to the request to change the first keypad image displayed at the touchscreen;
means for updating a first keypad image mapping corresponding to the first keypad image to a second keypad image mapping corresponding to the second keypad image;
means for receiving a second input location coordinate at the secure execution environment from the touchscreen driver; and
means for converting, using the second keypad image mapping, the second input location coordinate at the secure execution environment to a character or a symbol.

40. The device of claim 34, wherein providing the first keypad image includes providing the first keypad image to a display driver associated with the insecure execution environment.

41. The device of claim 40, further comprising:
means for obtaining a plurality of keypad images, the plurality of keypad images including the first keypad image; and
means for selecting the first keypad image of the plurality keypad images prior to providing the first keypad image to the display driver associated with the insecure execution environment.

42. The device of claim 41, wherein converting the first input location coordinate at the secure execution environment includes converting the first input location coordinate at the secure execution environment to the request to change the first keypad image displayed at the touchscreen, and the device further comprises:
means for providing a second keypad image of the plurality of keypad images from the secure execution environment to the display driver associated with the insecure execution environment;
means for updating a first keypad image mapping corresponding to the first keypad image to a second keypad image mapping corresponding to the second keypad image;
means for receiving a second input location coordinate at the secure execution environment from the touchscreen driver; and
means for converting, using the second keypad image mapping, the second input location coordinate at the secure execution environment to a character or a symbol.

43. A processor readable medium having one or more instructions operational in a device for secure input using a touchscreen, the instructions which when executed by at least one processor causes the processor to:
implement an insecure execution environment that includes an operating system of the device;
implement a secure execution environment configured to communicate with the insecure execution environment, the secure execution environment including a touchscreen driver dedicated to the secure execution environment;
provide a first keypad image from the secure execution environment to be displayed by the touchscreen;
receive a first input location coordinate at the secure execution environment from the touchscreen driver; and
convert the first input location coordinate at the secure execution environment to at least one of a character, a symbol, and/or a request to change the first keypad image displayed at the touchscreen.

44. The processor readable medium of claim 43, wherein data stored or processed at the secure execution environment is secure from unauthorized access by an application associated with the insecure execution environment.

45. The processor readable medium of claim 44, wherein convert the first input location coordinate at the secure execution environment includes convert the first input location coordinate at the secure execution environment to the request to change the first keypad image displayed at the touchscreen, and the instructions which when executed by the processor further causes the processor to:
- obtain a plurality of keypad images, the plurality of keypad images including the first keypad image and a second keypad image;
- provide the plurality of keypad images from the secure execution environment to a display driver associated with the insecure execution environment; and
- transmit a first request to display the first keypad image to the display driver prior to receiving the first input location coordinate.

46. The processor readable medium of claim 45, wherein provide the first keypad image includes provide the first keypad image to a display driver associated with the insecure execution environment, and the instructions which when executed by the processor further causes the processor to:
- obtain a plurality of keypad images, the plurality of keypad images including the first keypad image; and
- select the first keypad image of the plurality keypad images prior to providing the first keypad image to the display driver associated with the insecure execution environment.

\* \* \* \* \*